US009398062B2

(12) United States Patent
Han et al.

(10) Patent No.: US 9,398,062 B2
(45) Date of Patent: Jul. 19, 2016

(54) TIMING SYNCHRONIZATION IN DISCOVERY SIGNALS

(71) Applicant: Intel IP Corporation, Santa Clara, CA (US)

(72) Inventors: Seunghee Han, Santa Clara, CA (US); Gang Xiong, Beaverton, CA (US); Debdeep Chatterjee, Santa Clara, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 285 days.

(21) Appl. No.: 14/142,572

(22) Filed: Dec. 27, 2013

(65) Prior Publication Data

US 2014/0293988 A1 Oct. 2, 2014

Related U.S. Application Data

(60) Provisional application No. 61/806,821, filed on Mar. 29, 2013.

(51) Int. Cl.
*H04B 7/208* (2006.01)
*H04L 29/06* (2006.01)
(Continued)

(52) U.S. Cl.
CPC .............. *H04L 65/4092* (2013.01); *H04B 1/56* (2013.01); *H04B 7/0417* (2013.01); *H04B 7/0456* (2013.01); *H04B 7/0617* (2013.01); *H04B 7/0634* (2013.01); *H04L 1/1864* (2013.01);
(Continued)

(58) Field of Classification Search
CPC ...................................................... H04W 48/16
USPC ........................................................ 370/344
See application file for complete search history.

(56) References Cited

U.S. PATENT DOCUMENTS

2009/0310588 A1* 12/2009 Padovani ............... H04B 7/264
370/342
2011/0078453 A1* 3/2011 Mueck ................. H04L 9/0838
713/179

(Continued)

FOREIGN PATENT DOCUMENTS

WO WO 2012/068731 A1 5/2012
WO WO 2012/128505 A2 9/2012

OTHER PUBLICATIONS

International Search Report and Written Opinion mailed Jun. 30, 2014 from International Application No. PCT/US2014/032264.
(Continued)

*Primary Examiner* — Wei Zhao
(74) *Attorney, Agent, or Firm* — Schwabe, Williamson & Wyatt, P.C.

(57) ABSTRACT

Embodiments described herein relate generally to a device that is to transmit signals using a control channel. The device may be, for example, a user equipment or low-powered radio access node. Before transmitting the signal, the transmitting device may modify symbols associated with the signal. For example, the transmitting device may generate a scrambling sequence and modulate the symbols associated with the signal with the scrambling sequence. In another example, the transmitting device may apply a shifting pattern or hopping pattern to the sequence indices associated with sequences for symbols to be included in the signal. The applied pattern may change one or more sequence indices associated with one or more symbol indices associated with the signal. Other embodiments may be described and claimed.

12 Claims, 12 Drawing Sheets

(51) Int. Cl.
| | | |
|---|---|---|
| H04L 5/00 | (2006.01) | |
| H04B 1/56 | (2006.01) | |
| H04W 48/16 | (2009.01) | |
| H04W 56/00 | (2009.01) | |
| H04W 76/02 | (2009.01) | |
| H04W 36/30 | (2009.01) | |
| H04B 7/04 | (2006.01) | |
| H04W 24/00 | (2009.01) | |
| H04W 36/26 | (2009.01) | |
| H04W 48/18 | (2009.01) | |
| H04W 24/10 | (2009.01) | |
| H04W 36/00 | (2009.01) | |
| H04W 36/22 | (2009.01) | |
| H04L 1/18 | (2006.01) | |
| H04W 24/02 | (2009.01) | |
| H04W 72/04 | (2009.01) | |
| H04W 72/08 | (2009.01) | |
| H04W 28/20 | (2009.01) | |
| H04L 29/08 | (2006.01) | |
| H04M 1/725 | (2006.01) | |
| H04W 4/02 | (2009.01) | |
| H04W 8/02 | (2009.01) | |
| H04W 8/06 | (2009.01) | |
| H04W 28/02 | (2009.01) | |
| H04B 7/06 | (2006.01) | |
| H04W 48/06 | (2009.01) | |
| H04W 28/08 | (2009.01) | |
| H04W 36/08 | (2009.01) | |
| H04W 48/12 | (2009.01) | |
| H04W 88/08 | (2009.01) | |
| H04W 84/04 | (2009.01) | |
| H04W 88/10 | (2009.01) | |
| H04W 84/12 | (2009.01) | |
| H04W 88/02 | (2009.01) | |

(52) U.S. Cl.
CPC ............ *H04L 5/0048* (2013.01); *H04L 5/0051* (2013.01); *H04L 5/0057* (2013.01); *H04L 5/0073* (2013.01); *H04L 5/0085* (2013.01); *H04L 65/601* (2013.01); *H04L 65/607* (2013.01); *H04L 65/608* (2013.01); *H04L 65/80* (2013.01); *H04L 67/02* (2013.01); *H04M 1/72522* (2013.01); *H04M 1/72572* (2013.01); *H04W 4/021* (2013.01); *H04W 8/02* (2013.01); *H04W 8/06* (2013.01); *H04W 24/00* (2013.01); *H04W 24/02* (2013.01); *H04W 24/10* (2013.01); *H04W 28/0205* (2013.01); *H04W 28/0226* (2013.01); *H04W 28/0289* (2013.01); *H04W 28/085* (2013.01); *H04W 28/20* (2013.01); *H04W 36/0005* (2013.01); *H04W 36/22* (2013.01); *H04W 36/26* (2013.01); *H04W 36/30* (2013.01); *H04W 48/06* (2013.01); *H04W 48/16* (2013.01); *H04W 48/18* (2013.01); *H04W 56/001* (2013.01); *H04W 72/0446* (2013.01); *H04W 72/082* (2013.01); *H04W 76/021* (2013.01); *H04W 76/023* (2013.01); *H04W 76/025* (2013.01); *H04L 5/0007* (2013.01); *H04W 36/08* (2013.01); *H04W 48/12* (2013.01); *H04W 84/042* (2013.01); *H04W 84/045* (2013.01); *H04W 84/12* (2013.01); *H04W 88/02* (2013.01); *H04W 88/08* (2013.01); *H04W 88/10* (2013.01); *Y02B 60/50* (2013.01)

(56) References Cited

U.S. PATENT DOCUMENTS

| | | | |
|---|---|---|---|
| 2011/0268101 A1 | 11/2011 | Wang et al. | |
| 2011/0275382 A1 | 11/2011 | Hakola et al. | |
| 2012/0115518 A1* | 5/2012 | Zeira | H04W 8/005 455/500 |
| 2014/0233475 A1* | 8/2014 | Ro | H04W 76/023 370/329 |
| 2015/0071189 A1* | 3/2015 | Park | H04W 76/023 370/329 |

OTHER PUBLICATIONS

Interdigital, "Recommendations for D2D evaluation methodology and assumptions," 3GPP TSG-RAN WG1 Meeting #72, R1-130236, Jan. 28-Feb. 1, 2013, St Julian's, Malta, 5 pages.

* cited by examiner

TIMING SYNCHRONIZATION IN DISCOVERY SIGNALS

CROSS REFERENCE TO RELATED APPLICATIONS

This application claims priority under 35 U.S.C. §119(e) to U.S. Provisional Patent Application No. 61/806,821 entitled "ADVANCED WIRELESS COMMUNICATION SYSTEMS AND TECHNIQUES," filed Mar. 29, 2013, the disclosure of which is incorporated herein by reference.

FIELD OF INVENTION

Embodiments of the present invention relate generally to the technical field of data processing, and more particularly, to devices adapted to operate in wireless networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by the inclusion in this section.

Wireless communication systems experience increasingly heavier loads with the widespread adoption of smartphones, tablets, mobile hotspots and the like. Device-to-device ("D2D") communication may improve functionality and/or services available at a device by, for example, increasing bandwidth. D2D communication may allow a user equipment ("UE") to communicate directly with a second UE through a direct local link that circumvents an evolved Node B ("eNB") or other base station. Often, two UEs that are to engage in D2D communication may be relatively proximate to one another, allowing for increased data transfer (e.g., high bit rates) that corresponds to decreased power consumption.

In addition to D2D communication, the inclusion of one or more small cells in a wireless network environment may aid in the management of increased traffic on a wireless network. A small cell is typically provided through a device that is a low-powered radio access node that may operate in licensed and/or unlicensed spectrums. These low-powered radio access nodes have a transmission power that is less than that of a macro node or other high-powered cellular base station. For example, the range of such low-powered radio access nodes is often between ten (10) meters to two (2) kilometers, whereas the range of a macro node might be several tens of kilometers.

To realize the benefits of D2D communication and small cell enhancements, synchronization may be performed across the participating devices. Synchronization may ensure that one or more UEs participating in a network, such as a radio network, operate according to parameters defined by an appropriate standard (e.g., the 3rd Generation Partnership Project (3GPP) standard). For example, a device (e.g., a low-powered radio access node or a UE) may transmit a discovery signal to a proximate UE so that the proximate UE may perform operations related to timing acquisition, paging, data exchange, and the like.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Figure 1:
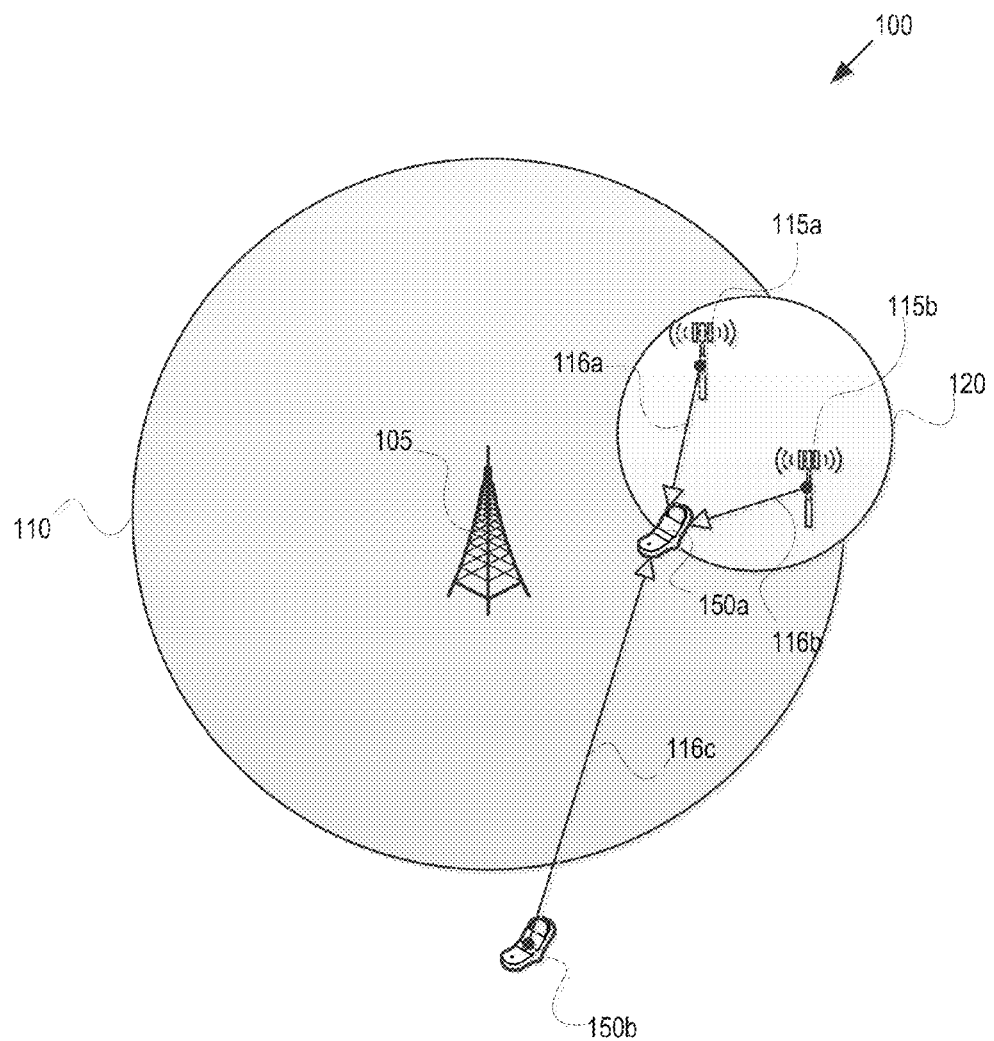
FIG. 1 is block diagram illustrating an exemplary wireless communication network illustrating a plurality of devices adapted to transmit a discovery signal to a device, in accordance with various embodiments.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or "B" and "A and/or B" means (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the terms "module" and/or "logic" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable hardware components that provide the described functionality.

Embodiments described herein relate generally to discovery signals and how a discovery signal may be robustly transmitted and received in a network. In a wireless network environment, such as a wireless network environment that includes D2D communication and/or small cell enhancements, discovery between devices may be initiated through a discovery signal. A device, such as a UE or a low-powered radio access node, may transmit a discovery signal to a proximate device (e.g., a proximate UE) for D2D communication and/or small cell enhancement. The discovery signal may be used for timing acquisition. Correspondingly, an aperiodic autocorrelation profile associated with the discovery signal, such as an aperiodic autocorrelation profile of a PUCCH used to transmit the discovery signal, may be improved to improve timing acquisition between the transmitting device and the proximate device.

In various embodiments, a device may modify a discovery signal by applying a predetermined function to a sequence index associated with a sequence for a symbol that is to be included in the discovery signal. For example, the device may modify at least one sequence index associated with at least one symbol index so that the sequence index is associated with another symbol index. According to one embodiment, a predetermined function may shift a plurality of sequence indices such that a first sequence index associated with a first symbol index is changed to an adjacent symbol index (e.g., a sequence index associated with the symbol index 1 may be changed to the symbol index 2). In another embodiment, the predetermined function may change a first sequence index associated with a first symbol index of a plurality of symbols to a pseudorandom symbol index based on a pseudorandom hopping pattern (e.g., a sequence index associated with the symbol index 1 may be changed to the symbol index 4 based on the pseudorandom hopping pattern).

In various embodiments, a device may modify a discovery signal by scrambling a plurality of symbols associated with the discovery signal based on a scrambling sequence. The device may generate this scrambling sequence or may have it stored therein. The scrambling sequence may be generated based on, for example, a Golay sequence or a constant amplitude zero autocorrelation ("CAZAC") sequence. The device may scramble symbols in a slot or frame associated with the discovery signal based on the generated scrambling sequence. In some embodiments, this scrambling may be applied on top of an orthogonal cover code.

FIG. 1 illustrates an exemplary wireless network environment 100, according to one embodiment. The wireless network environment 100 may include a plurality of UEs 150 that may be adapted to operate in a wireless network. According to embodiments, a UE 150 may be any device adapted to connect with the eNB 105 and/or with one or more low-powered radio access nodes 115 according to, for example, one or more 3GPP technical specifications. In some embodiments, the UE may be a hand-held telephone, a laptop computer, or other similar device equipped with a mobile broadband adapter. Therefore, a UE 150 may be adapted to administrate one or more tasks in the environment 100, including mobility management, call control, session management, and identity management. In various embodiments, one or both of the UEs 150 may be public safety devices adapted to operate on a radio spectrum associated with public safety (e.g., a radio spectrum reserved by the Federal Communications Commission).

The plurality of low-powered radio access nodes 115 may be included in the wireless network environment 100 to provide one or more small cells 120. According to the embodiment, a low-powered radio access node 115 may include one or more of a femtocell, picocell, microcell, remote radio head ("RRH"), or essentially any similar low-powered cellular base station adapted to provide a small cell 120 with a range of about less than two (2) kilometers ("km"). The small cells 120 may operate on a second frequency F2 that is different than the first frequency F1 (although the two frequencies may be the same in alternative embodiments).

In the wireless network environment 100, two UEs 150*a, b* may be proximate to one another such that one or both UEs 150 may engage in proximity-based services with the other UE 150. With proximity-based services, a first UE (e.g., the first UE 150*a*) may be sufficiently proximate to a second UE (e.g., the second UE 150*b*) so that the first and second UEs 150*a, b* may be adapted to exchange data with one another without some or all of the data reaching the eNB 105. Proximity-based services may facilitate communication between the UEs 150 for D2D communication, to engage in D2D services, decrease load on the wireless cell 110, increase data transmission speed and/or reliability, and the like.

Also in the wireless network environment 100, a UE 150 may operate on a small cell 120 provided by a low-powered radio access node 115 so that the UE 150 may experience increased bandwidth and/or network reliability. With both an eNB and one or more low-powered radio access nodes 115 available, a UE 150 may be provided both macro-node layer and local-node layer coverage. With such coverage, the bandwidth and/or network reliability (e.g., near the edge of macro cell 110) may be increased for a UE 150 through data offloading, carrier aggregation, and other similar technologies.

In various embodiments, a first UE 150*a* may be synchronized to a low-powered radio access node 115 and/or a second UE 150*b*. Where the first UE 150*a* is synchronized to a device 115, 150*b*, the first UE 150*a* and the other device 115, 150*b* may transmit data between one another. In the wireless network environment 100, the first UE 150*a* and the other device 115, 150*b* may be synchronized, for example, where the two are connected to a same serving cell (e.g., the macro cell 110), where the two are within a same cluster (e.g., a D2D cluster, such as where the first UE 150*a* and the second UE 150*b* are proximate to one another), where the two are connected to different cells and provided with assistant information by the network, or where the two have a global navigation satellite system ("GNSS") with a satisfactory temperature compensated crystal oscillator (e.g., a satisfactory temperature compensated crystal oscillator having a tolerance of about 0.1 or 0.2 parts per million). Conversely, the first UE 150*a* and the other device 115, 150*b* may be unsynchronized, for example, where the two are connected to different serving cells, the two are in different clusters (e.g., different D2D clusters), or where a UE 150*a, b* is operating with limited service (e.g., in public safety mode) and does not feature a satisfactory GNSS. If the first UE 150*a* and the other device 115, 150*b* are unsynchronized, synchronization may be necessary for communication between the two.

In connection with proximity-based services and small cell enhancements available in the wireless network environment 100, a first UE 150*a* may be adapted to receive one or more signals 116 from a second UE 150*b* and/or a low-powered radio access node 115—e.g., a signal 116 may be used for discovery and/or synchronization. A signal 116 may be used for timing acquisition at a device—e.g., a first UE 150*a* may determine a correct start symbol when receiving data from a low-powered radio access node 115 and/or a second UE 150*b*. In some embodiments, a signal 116 may include identifying information. For example, a signal 116*a, b* may include a signature and/or sequence (e.g., a base and/or orthogonal sequence) to distinguish a first low-powered radio access node 115*a* from a second low-powered radio access node 115*b* in one or more small cells 120. According to various embodiments, a second UE 150*b* may transmit a signal 116*c* to a first UE 150*a* for proximity-based services between the UEs 150*a, b*.

Figure 2:
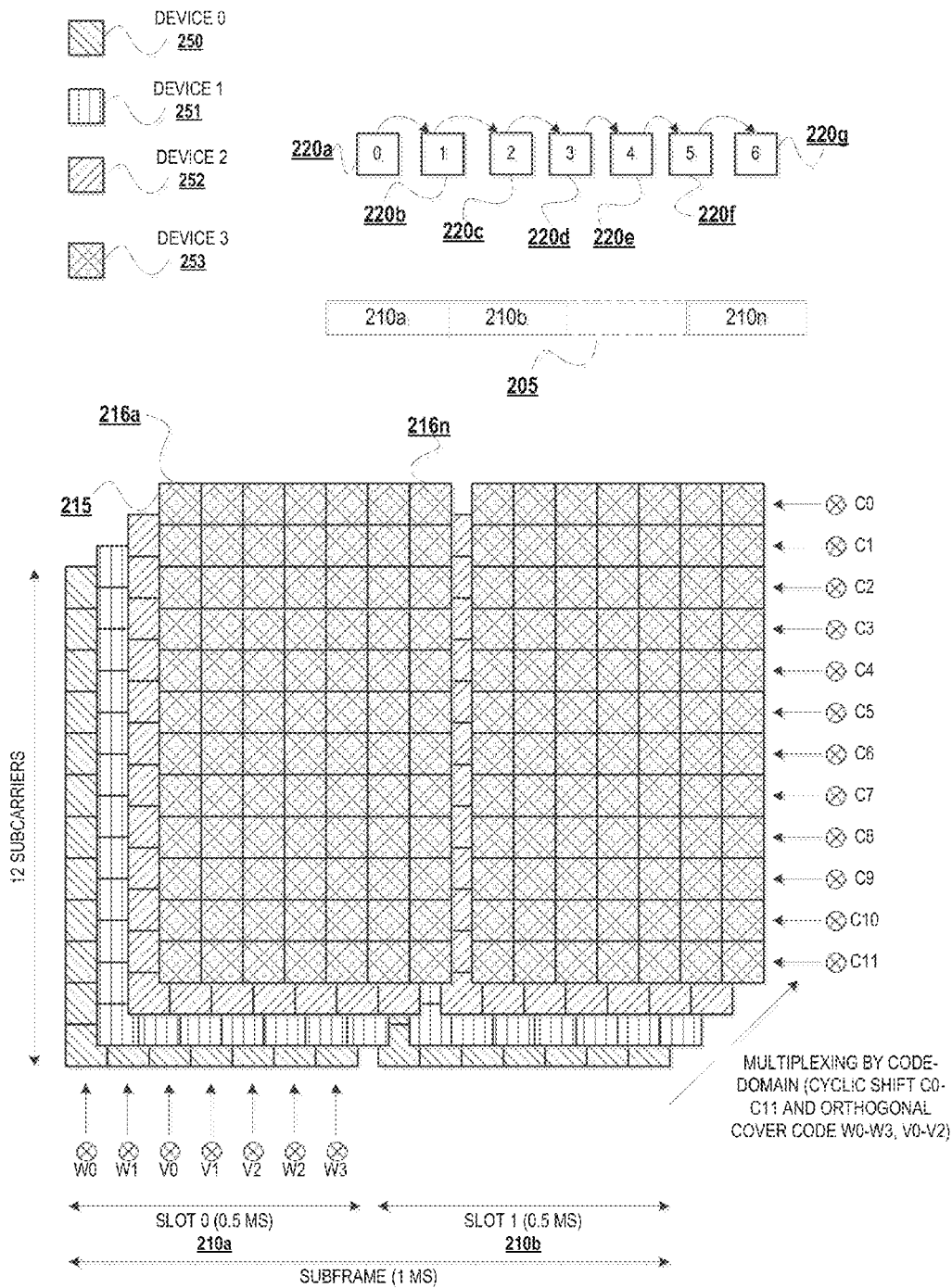
FIG. 2 is a block diagram illustrating a frame associated with a physical uplink control channel that includes a modification to at least one sequence index associated with at least one sequence by application of a predetermined function, in accordance with various embodiments.

Turning now to FIG. 2, a block diagram of an embodiment of a frame 205 associated with a physical uplink control channel is shown. In the frame 205, at least one sequence index for a sequence associated with a symbol index is to be modified by application of a predetermined function. In the context of FIG. 1, the radio frame 205 may correspond to a radio frame of a signal 116 transmitted by a low-powered radio access node 115 or a UE 150*b* to a receiving UE 150*a*. In the illustrated embodiment, the frame 205 is associated with a PUCCH format 1, 1a, and/or 1b. In other embodiments, the frame 205 may be associated with a PUCCH format 4. In such an embodiment, reference signal symbols (e.g., symbols associated with V0 through V2) may be absent and, therefore, there may be no distinction between symbols associated with a reference signal and symbols associated with data (e.g., symbols associated with W0 through W3). In other embodiments, the radio frame 205 may be associated with another control channel CDM structure that may be similar to a PUCCH, such as a structure that may support both coherent and non-coherent detection at a receiving device.

The radio frame 205, which may be transmitted as one of a plurality, is composed of subframes, with each subframe having a plurality of slots 210 (e.g., two). A resource block 215 may comprise one slot 210 in the time domain and a plurality of subcarriers (e.g., twelve subcarriers) in the frequency domain. The one slot 210 in the time domain may include a plurality of symbols 216 (e.g., six or seven). In various embodiments, symbols 216 included in the slot 210 may be, for example, orthogonal frequency-division multiplexing (OFDM) and/or single-carrier frequency division multiple access (SC-FDMA). According to embodiments, a symbol 216 to be included in a slot 210 may be associated with a sequence 220. For example, a first symbol 216*a* may be generated through a base sequence 220*a*.

In the illustrated embodiment, a cyclic shift in the time domain within one OFDM/SC-FDMA symbol may be applied to a plurality of subcarriers and the cyclic shift in time domain within one OFDM/SC-FDMA symbol may correspond to the phase rotational orthogonal sequence in frequency domain—that is, a phase rotational orthogonal sequence element C0 may be applied to a first subcarrier, C1 may be applied a second subcarrier, and continuing until C11 may be applied to a twelfth subcarrier of a resource block 215. In the time domain, a plurality of symbols may have an orthogonal cover code applied thereto—e.g., of length 6 for extended cyclic prefix or length 7 for normal cyclic prefix. This orthogonal cover code may be, for example, a Discrete Fourier transform sequence or Walsh-Hadamard sequence. In various embodiments, a first orthogonal cover code W0-W3 may be applied to symbols used for data transmission, while a second orthogonal cover code V0-V2 may be applied to symbols used for reference signal transmission. In another embodiment, a first orthogonal cover code W0-W6 may be applied to all symbols of the slot 210—for example, where there is no distinction between the reference signal symbols and data symbols as in PUCCH format 4.

In various embodiments, the resource block 215 of the frame 205 may be used for discovery and/or synchronization, and therefore reference signal symbols associated with the orthogonal cover code V0-V2 may be unnecessary for channel estimation. The multiplexing capacity of the reference signal symbols may be thirty-six (e.g., twelve subcarriers C0-C11 in the frequency domain multiplied by three orthogonal cover code V0-V2 symbols in the time domain), whereas the capacity in the data symbols associated the orthogonal cover code W0-W3 may be forty-eight (e.g., twelve subcarriers C0-C11 in the frequency domain multiplied by four orthogonal cover code W0-W3 symbols in the time domain). Therefore, the overall multiplexing capacity may be limited to thirty-six by the reference signal symbols associated with the orthogonal cover code V0-V2.

The resource block 215 may include a plurality of symbols 216 generated based on one or more sequences 220, which may be (or may be included in) a base sequence and/or an orthogonal sequence. Each symbol 216 may be associated with a symbol index in the time domain—e.g., a first symbol 216*a* may be associated with the symbol index 0, a second symbol may be associated with the symbol index 1, and so forth. A device that is to transmit a signal having the frame 205 may modify the signal by applying a predetermined function to the one or more sequence indices associated with one or more sequences 220 so that a symbol 216 may be generated based on a sequence 220 with associated with a modified sequence index.

In various embodiments, the predetermined function to be applied by a device may shift the one or more sequence indices associated with one or more sequences 220 to change associations between the sequence indices and the symbol indices. For example, a sequence index may be shifted from a first symbol index to a next symbol index, where the sequence index for the next symbol index is an adjacent sequence index to the sequence index for the first symbol. As illustrated, a first sequence 220a having a first sequence index originally associated with the symbol index 0 may be shifted to be associated with the adjacent symbol index 1, the second sequence 220b having a second sequence index originally associated with the symbol index 1 may be shifted to be associated with the adjacent symbol index 2, and so forth. It should be noted that the sequences 220a-g and the depicted shifting pattern is for illustrative purposes, and the sequences 220a-g may be appreciably longer (e.g., there may be thirty sequences).

According to embodiments, a sequence 220 may be shown as $\bar{r}_{u,v}(n)$, where u may be a group number (e.g., a base sequence group number such that $u \in \{0, 1, \ldots, 29\}$) and v is a sequence number within the group (e.g., each group contains one base sequence v=0). Then a cyclic shift $\alpha$ of a sequence $\bar{r}_{u,v}(n)$ may be defined as $\bar{r}_{u,v}^{(\alpha)}(n) = e^{j\alpha n}\bar{r}_{u,v}(n)$, $0 \le n \le M_{sc}^{RS}$, where $M_{sc}^{RS}$ is a length of the sequence 220. Applying a predetermined function to shift a sequence index for a the sequence 220 from an association with a first symbol index to an adjacent symbol index may be defined as $\bar{r}_{u,v}^{(\alpha)}(n) = e^{j\alpha n}\bar{r}_{u,v,l}(n)$, $0 \le n \le M_{sc}^{RS}$, where l is the symbol index (e.g., l may be equal to 0, 1, 2, ...), $\bar{r}_{u,v,l}(n) = \bar{r}_{u+f(l),v}(n)$, and f(l) is given by a shifting function or pattern (that may be equal to l). For example, a sequence 220b may be given by $\bar{r}_{u1,v1}$ and may be shifted to be associated with the symbol index 1.

In other embodiments, the predetermined function to be applied by a device may modify r a sequence index associated with a sequence 220 to change an association of the first sequence index from a first symbol index to a pseudorandom symbol index. For example, a base sequence index u in a first symbol originally associated with the symbol index 0 may be changed to be associated with a symbol index 4, a base sequence index in the second symbol originally associated with the symbol index 1 may be changed to be associated with the symbol index 6, and so forth until the base sequence in each symbol is pseudo-randomly associated with a symbol index that may not be the symbol index with which a base sequence index was originally associated.

According to embodiments, the sequence 220 may be shown as $\bar{r}_{u,v}(n)$. Then a cyclic shift $\alpha$ of a sequence $\bar{r}_{u,v}(n)$ may be defined as $\bar{r}_{u,v}^{(\alpha)}(n) = e^{j\alpha n}\bar{r}_{u,v}(n)$, $0 \le n \le M_{sc}^{RS}$ is a length of the sequence. Applying a predetermined function that includes a pseudorandom hopping pattern to one or more sequence indices of a one or more sequences 220 to change a respective symbol index associated with a respective sequence index to be a respective pseudorandom symbol index may be defined as $\bar{r}_{u,v}^{(\alpha)}(n) = e^{j\alpha n}\bar{r}_{u,v,l}(n)$, $0 \le n \le M_{sc}^{RS}$, where l is the symbol index (e.g., l may be equal to 0, 1, 2, ...), $\bar{r}_{u,v,l}(n) = \bar{r}_{u+f(l),v}(n)$, and f(l) may be generated from the pseudorandom hopping pattern.

According to various embodiments, the predetermined function or pattern may be different across a plurality of devices 250-253. However, the predetermined function or pattern may be common across devices (e.g., devices 250, 251) within a same cluster (e.g., a small cell cluster or D2D cluster) and/or connected to a same cell to preserve orthogonality by CDM (e.g., orthogonality associated with one or more cyclic shift(s) and orthogonal cover code(s)). In another embodiment to preserve orthogonality, the predetermined function or pattern may be common across devices 250-253, even where those devices are not connected to a same cell or cluster.

Figure 3:
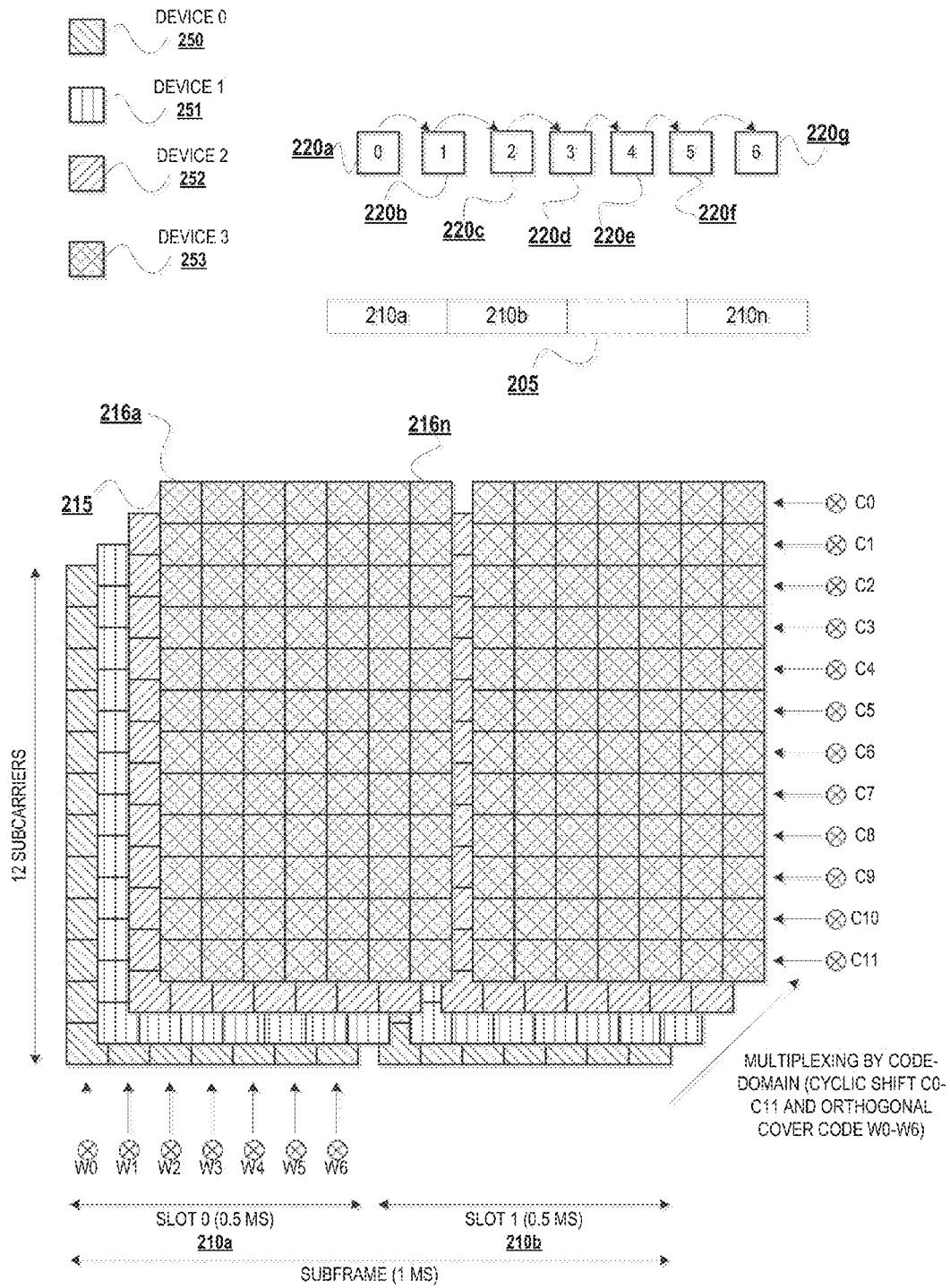
FIG. 3 is a block diagram illustrating a frame associated with a physical uplink control channel that includes a modification to at least one sequence index associated with at least one sequence by application of a predetermined function, in accordance with various embodiments

Similar to FIG. 2, FIG. 3 shows a block diagram of an embodiment of a frame 205 associated with a physical uplink control channel is shown. In the frame 205, at least one sequence index for a sequence associated with a symbol index is to be modified by application of a predetermined function. In the embodiment of FIG. 3, a PUCCH format 4 is illustrated, therefore there is no distinction between the reference signal symbols and data symbols. An orthogonal cover code W0-W6 may be applied to all symbols of the slot 210. A length-7 orthogonal cover code W0-W6 (e.g., a Discrete Fourier transformation sequence or Walsh-Hadamard sequence) may be applied and the multiplexing capacity of the reference signal symbols may be eighty-four (e.g., twelve subcarriers C0-C11 in the frequency domain multiplied by seven orthogonal cover code W0-W6 symbols in the time domain). One or more sequence indices may be changed from an association with a first symbol index to a next (e.g., through shifting or hopping) as described with respect to FIG. 2.

Figure 4A:
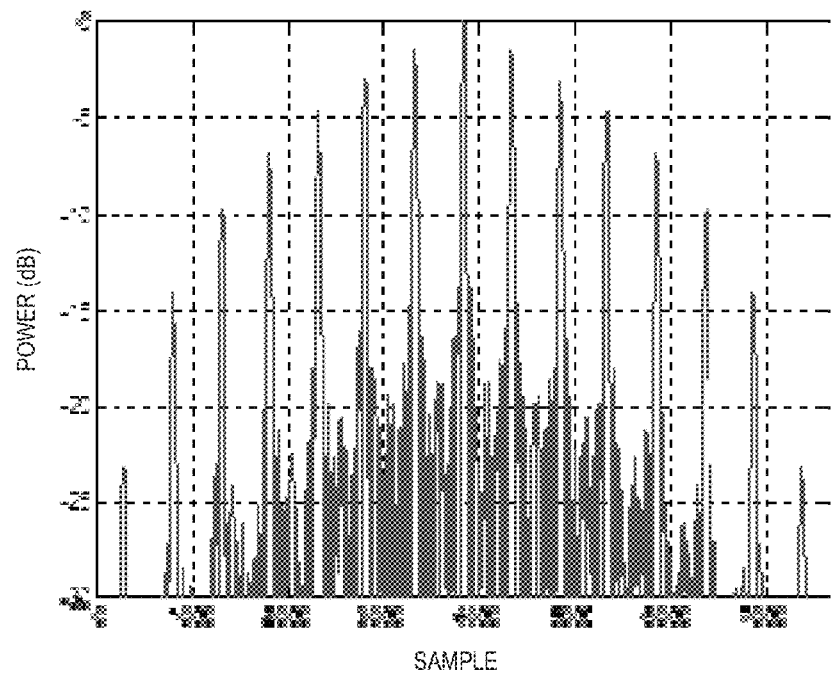
FIG. 4A is a graph diagram illustrating an aperiodic auto-correlation profile for a physical uplink control channel ("PUCCH") format 1.
Figure 4B:
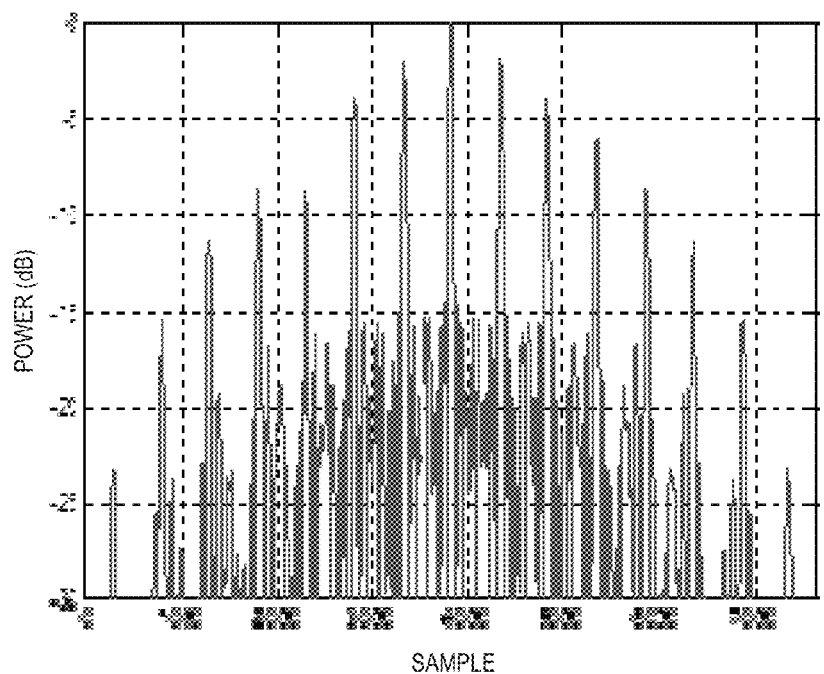
FIG. 4B is a graph diagram illustrating an aperiodic auto-correlation profile for a PUCCH format 4.

Turning to FIG. 4A and FIG. 4B, two graph diagrams illustrate aperiodic autocorrelation profiles. FIG. 4A illustrates an aperiodic autocorrelation profile for a PUCCH format 1, while FIG. 4B illustrates an aperiodic autocorrelation profile for a PUCCH format 4. When an orthogonal cover code vector consists of all "1" elements, then the autocorrelation property associated with the PUCCH format 1 may be undesirable. The undesirable autocorrelation profile may be attributed to the repetitive waveforms in OFDM/SC-FDMA symbol by symbol. As illustrated, the highest peaks to the main peak are found around −2 dB.

Figure 4C:
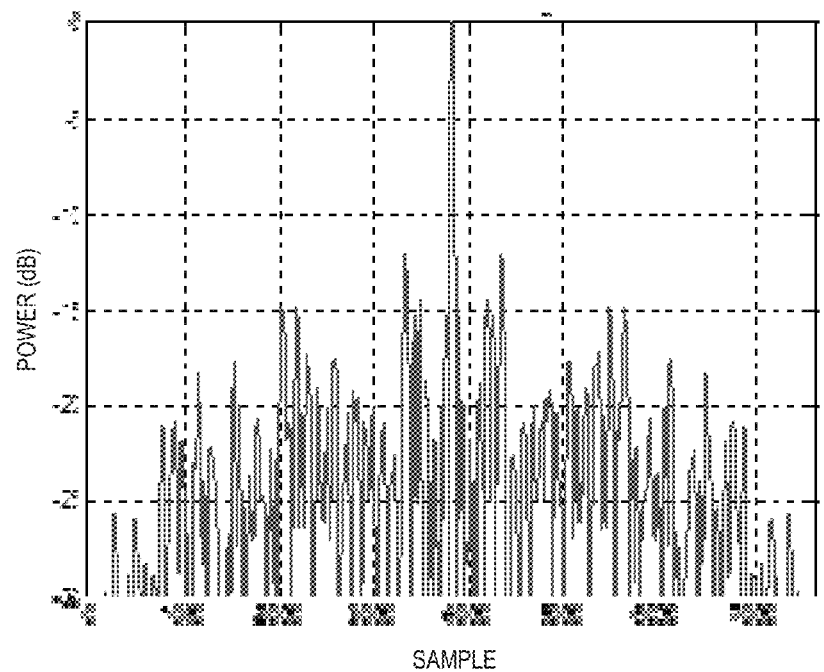
FIG. 4C is a graph diagram illustrating an aperiodic auto-correlation profile for a PUCCH format 1 that includes a modification to at least one sequence index associated with at least one sequence by application of a predetermined function, in accordance with various embodiments.
Figure 4D:
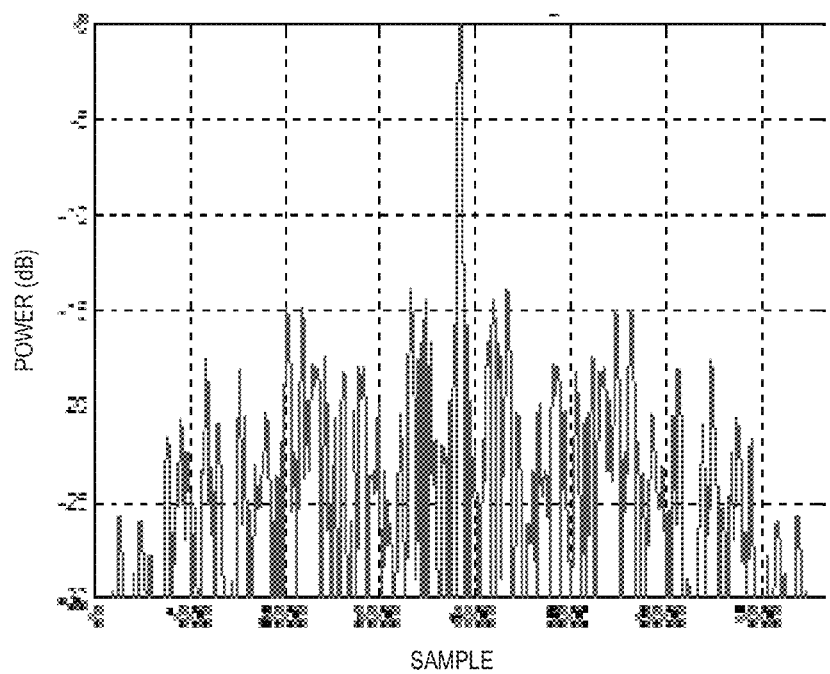
FIG. 4D is a graph diagram illustrating an aperiodic auto-correlation profile for a PUCCH format 4 that includes a modification to at least one sequence index associated with at least one sequence by application of a predetermined function, in accordance with various embodiments.

In contrast to FIG. 4A and FIG. 4B, FIGS. 4C and 4D illustrate improved aperiodic autocorrelation profiles. FIG. 4C illustrates how changing an association of sequence index with a first symbol index to another symbol index may improve aperiodic autocorrelation profiles for PUCCH format 1, 1a, 1b. FIG. 4D illustrates how changing an association of sequence index with a first symbol index to another symbol index may improve aperiodic autocorrelation profiles for PUCCH format 4. An improved aperiodic autocorrelation profile may correspond to improved timing acquisition between devices. In FIGS. 4C and 4D, the second highest peaks to the main peak are found around −13 dB. Therefore, the aperiodic autocorrelation profiles may be improved by approximately ten dB by changing an association of sequence index with a first symbol index to another symbol index.

Figure 5:
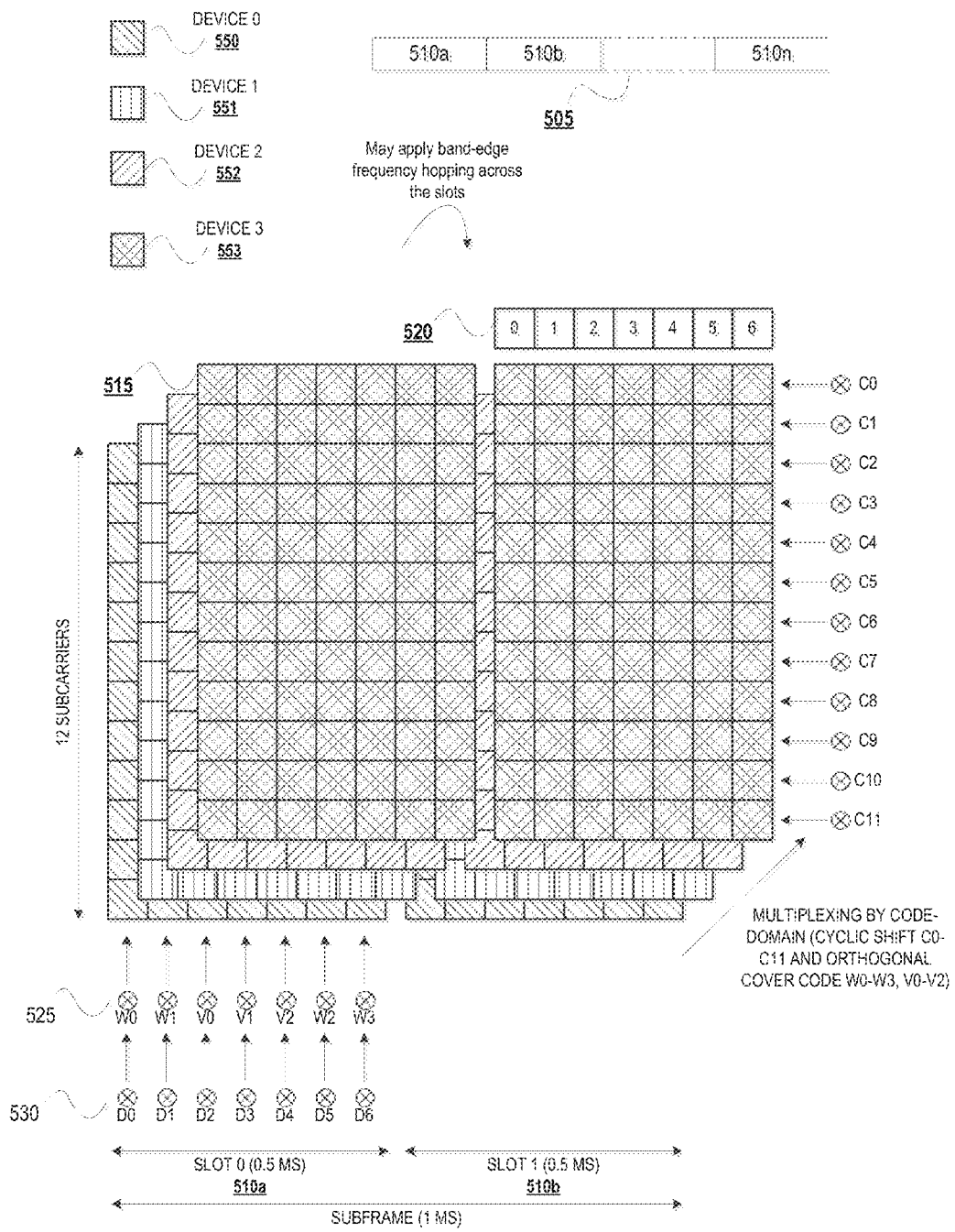
FIG. 5 is block diagram illustrating a frame associated with a physical uplink control channel in which a plurality of symbols are to be scrambled based on a scrambling sequence, in accordance with various embodiments.

With respect to FIG. 5, a block diagram of an embodiment of a frame 505 associated with a PUCCH is shown. In the frame 505, scrambling may be applied on top of at least one symbol and/or to each orthogonal cover code element based on a scrambling sequence. In the context of FIG. 1, the radio frame 505 may correspond to a radio frame of a signal 116 transmitted by a low-powered radio access node 115 or a UE 150b to a receiving UE 150a. In the illustrated embodiment, the frame 505 is associated with a PUCCH of format 1, 1a, and/or 1b. In other embodiments, the frame 505 may be associated with a PUCCH of format 4. In such an embodiment, reference signal symbols (e.g., symbols associated with V0 through V2) may be absent and, therefore, there may be no distinction between symbols associated with a reference signal and symbols associated with data (e.g., symbols associated with W0 through W3). In other embodiments, the radio frame 505 may be associated with another control channel CDM structure that may be similar to a PUCCH, such as a structure that may support both coherent and non-coherent detection at a receiving device.

The radio frame 505, which may be transmitted as one of a plurality, is composed of subframes, each subframe having a plurality of slots 510 (e.g., two). A resource block 515 may comprise one slot 510 in the time domain and a plurality of subcarriers (e.g., twelve subcarriers) in the frequency domain. The one slot 510 in the time domain may include a plurality of symbols (e.g., six or seven). In various embodiments, symbols included in the slot 510 may be, for example, orthogonal frequency-division multiplexing (OFDM) and/or single-carrier frequency division multiple access (SC-FDMA).

In the illustrated embodiment, a cyclic shift in time domain within one OFDM/SC-FDMA symbol may be applied to a plurality of subcarriers and the cyclic shift in time domain within one OFDM/SC-FDMA symbol may correspond to the phase rotational orthogonal sequence in frequency domain—that is, a phase rotational orthogonal sequence element C0 may be applied to a first subcarrier, C1 may be applied a second subcarrier, and continuing until C11 may be applied to a twelfth subcarrier of a resource block 515. In the time domain, a plurality of symbols may have an orthogonal cover code applied thereto—e.g., of length 6 for extended cyclic prefix, or length 7 for normal cyclic prefix. This orthogonal cover code may be, for example, a Discrete Fourier transform sequence or Walsh-Hadamard sequence. In various embodiments, a first orthogonal cover code W0-W3 may be applied to symbols used for data transmission, while a second orthogonal cover code V0-V2 may be applied to symbols used for reference signal transmission. In another embodiment, a first orthogonal cover code W0-W6 may be applied to all symbols of the slot 210—for example, where there is no discrimination between the reference signal symbols and data symbols as in PUCCH format 4.

In various embodiments, the resource block 515 of the frame 505 may be used for discovery and/or synchronization, and therefore reference signal symbols associated with the orthogonal cover code V0-V2 may be unnecessary for channel estimation. The multiplexing capacity of the reference signal symbols may be thirty-six (e.g., twelve subcarriers C0-C11 in the frequency domain multiplied by three orthogonal cover code V0-V2 symbols in the time domain), whereas the capacity in the data symbols associated the orthogonal cover code W0-W3 may be forty-eight (e.g., twelve subcarriers C0-C11 in the frequency domain multiplied by four orthogonal cover code W0-W3 symbols in the time domain). Therefore, the overall multiplexing capacity may be limited to thirty-six by the reference signal symbols associated with the orthogonal cover code V0-V2. In another embodiment, the resource block 515 of the frame 505 the reference signal symbols associated with the orthogonal cover code V0-V2 may be absent, and those symbol locations associated with V0-V2 may be used for data transmission. In such an embodiment, a length-7 orthogonal cover code W0-W6 (e.g., a discrete Fourier transformation sequence) may be applied and the multiplexing capacity of the reference signal symbols may be eighty-four (e.g., twelve subcarriers C0-C11 in the frequency domain multiplied by seven orthogonal cover code W0-W6 symbols in the time domain).

The resource block 515 may have mapped thereto a plurality of symbols from a plurality of symbols 520, which may be a base sequence and/or an orthogonal sequence. Each symbol may be associated with a symbol index in the time domain—e.g., a first symbol to be mapped from the plurality of symbols 520 may be associated with the symbol index 0, a second symbol to be mapped from the plurality of symbols 520 may be associated with the symbol index 1, and so forth. A device that is to transmit a signal having the frame 505 may modify the signal by applying a scrambling on top of the plurality of symbols included in frame 505 associated with the signal. That is, symbols of the plurality of symbols 520 to be mapped to the resource block 515 may be modulated with a scrambling sequence, such as a scrambling sequence having elements D0-D6. In the illustrated embodiment, the scrambling sequence D0-D6 may be applied to the symbols on the orthogonal cover code W0-W3, V0-V2. For example, symbols of the plurality of symbols 520 to be mapped to the resource block 515 may be modulated with the orthogonal cover code W0-W3, V0-V2 and those modulated symbols may be modulated with the scrambling sequence D0-D6. In other embodiments, the orthogonal cover code W0-W3, V0-V2 may be applied after the scrambling sequence D0-D6 or not at all.

According to various embodiments, the scrambling sequence D0-D6 to be applied to the symbols of the plurality of symbols 520 may be based on a Golay sequence, which may feature a good autocorrelation property, a constant amplitude zero autocorrelation ("CAZAC") sequence—e.g., a Zadoff-Chu sequence, or another sequence.

In embodiments, a plurality of radio frames similar to the radio frame 505 may be transmitted to a plurality of devices 550-553. Where there is a timing offset for a device 553 and/or multiple timing offsets for a plurality of devices 550-553, orthogonality may be compromised by code division multiplexing. For example, if the distance for a cyclic shift is five microseconds (μs) and a device receives a timing offset of one then a zero correlation zone ("ZCZ") may be reduced to 4 μs, which may adversely affect discovery and synchronization between transmitting and receiving devices 550-553. Accordingly, the cyclic shift C0-C11 value may be relatively large to accommodate this timing offset condition. For example, cyclic shift $\Delta_{shift}^{PUCCH}$ (equal to one, two, or three) may be configured where the network is available to the device 553. Where the network is unavailable to the device 553 (e.g., where the transmitting device is a public safety device), the value may be predetermined by a maximum distance (e.g., a maximum distance for safety)—e.g., $\Delta_{shift}^{PUCCH}$ may be equal to three.

According to various embodiments, the scrambling sequence may be different across a plurality of devices 550-553. However, the scrambling sequence may be common across devices (e.g., devices 550, 551) within a same cluster (e.g., a small cell cluster or D2D cluster) and/or connected to a same cell to preserve orthogonality by CDM (e.g., orthogonality associated with one or more cyclic shift(s) and orthogonal cover code(s)). In another embodiment to preserve orthogonality, the scrambling sequence may be common across devices 550-553, even where those devices are not connected to a same cell or cluster.

Figure 6:
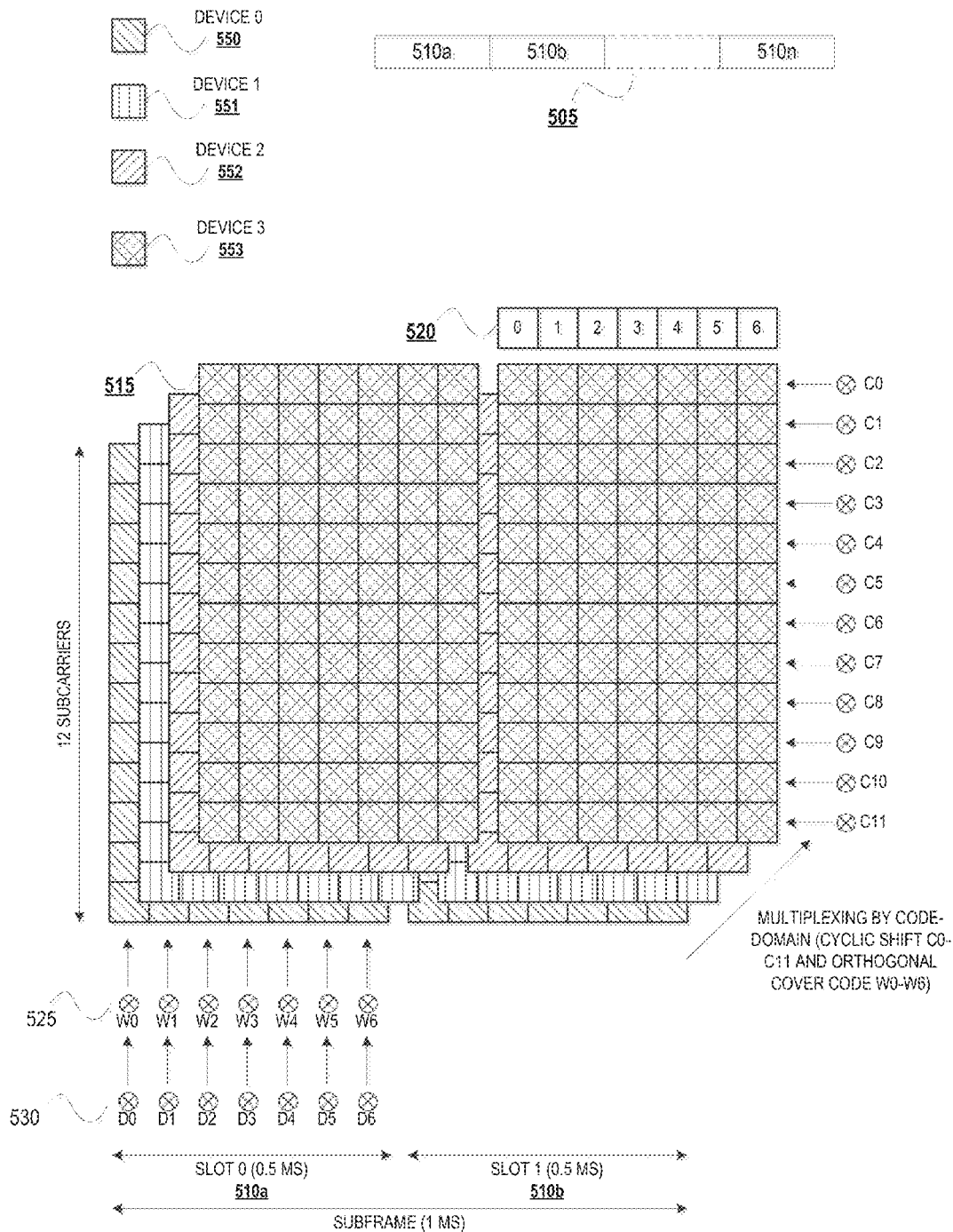
FIG. 6 is block diagram illustrating a frame associated with a physical uplink control channel in which a plurality of symbols are to be scrambled based on a scrambling sequence, in accordance with various embodiments.

Similar to FIG. 5, FIG. 6 shows a block diagram of an embodiment of a frame 205 associated with a physical uplink control channel is shown. In the frame 505, scrambling may be applied on top of at least one symbol and/or to each orthogonal cover code element based on a scrambling sequence. In the embodiment of FIG. 6, a PUCCH format 4 is illustrated, therefore there is no distinction between the reference signal symbols and data symbols. An orthogonal cover code W0-W6 may be applied to all symbols of the slot 510. A length-7 orthogonal cover code W0-W6 (e.g., a Discrete Fourier transformation sequence or Walsh-Hadamard sequence) may be applied and the multiplexing capacity of the reference signal symbols may be eighty-four (e.g., twelve subcarriers C0-C11 in the frequency domain multiplied by seven orthogonal cover code W0-W6 symbols in the time domain). A plurality of symbols may be scrambled on top of the orthogonal cover code W0-W6 as described with respect to FIG. 5.

Figure 7A:
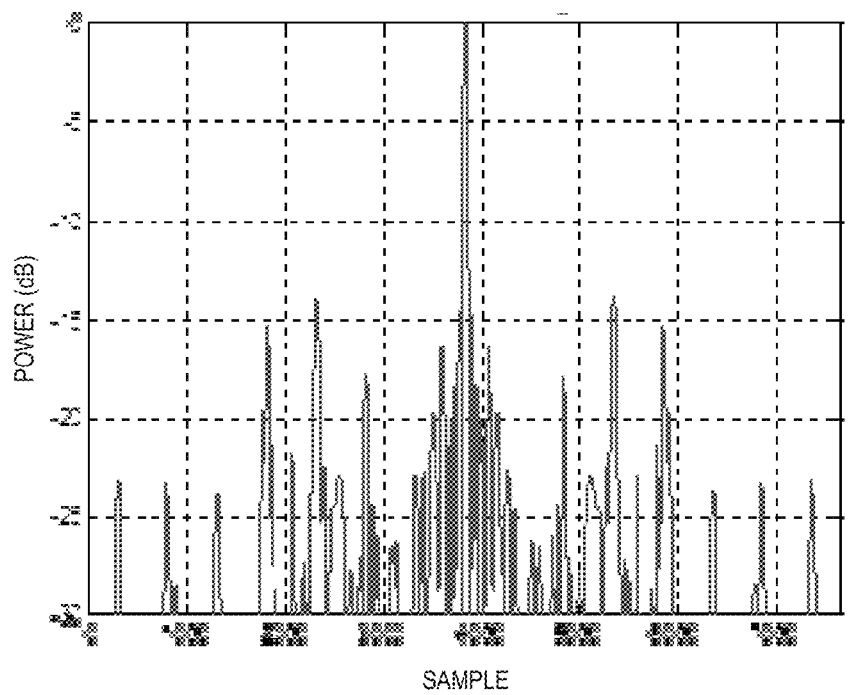
FIG. 7A is a graph diagram illustrating an aperiodic auto-correlation profile for a PUCCH format 1 in which a plurality of symbols are to be scrambled based on a scrambling sequence, in accordance with various embodiments.
Figure 7B:
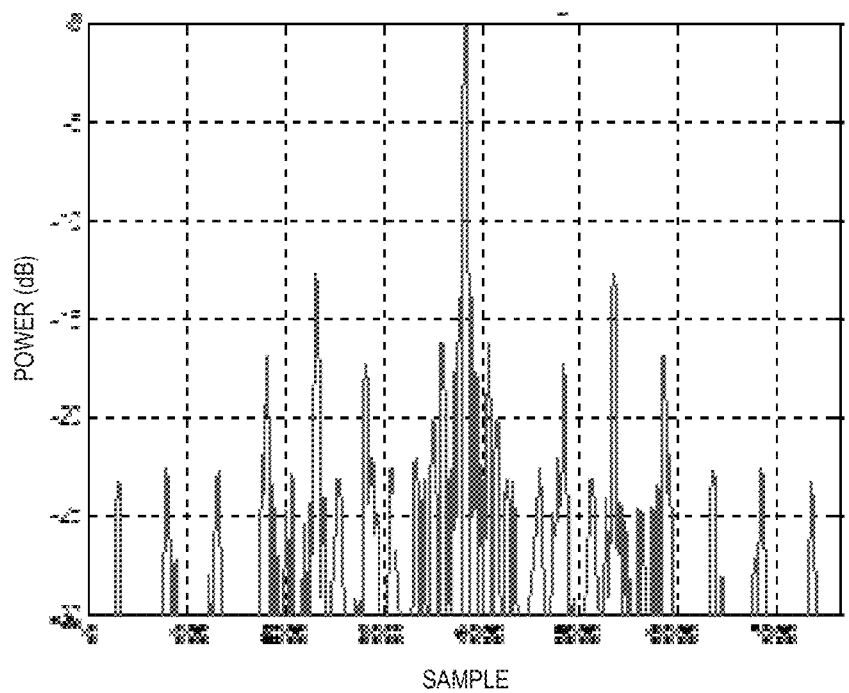
FIG. 7B is a graph diagram illustrating an aperiodic auto-correlation profile for a PUCCH format 4 in which a plurality of symbols are to be scrambled based on a scrambling sequence, in accordance with various embodiments.

In relation to FIG. 4A and FIG. 4B, FIGS. 7A and 7B illustrate improved aperiodic autocorrelation profiles over those aperiodic autocorrelation profiles illustrated in FIG. 4A and FIG. 4B. FIG. 7A illustrates how scrambling at least one symbol and/or to each orthogonal cover code element based on a scrambling sequence (e.g., a truncated Golay sequence) may improve aperiodic autocorrelation profiles for PUCCH format 1, 1a, 1b. FIG. 4D illustrates how scrambling at least one symbol and/or to each orthogonal cover code element based on a scrambling sequence may improve aperiodic autocorrelation profiles for PUCCH format 4. An improved aperiodic autocorrelation profile may correspond to improved timing acquisition between devices. In FIG. 7A and FIG. 7B, the second highest peaks to the main peak are found around −13 dB. Therefore, the aperiodic autocorrelation profiles may be improved by approximately ten dB by scrambling at least one symbol and/or to each orthogonal cover code element based on a scrambling sequence.

Figure 8:
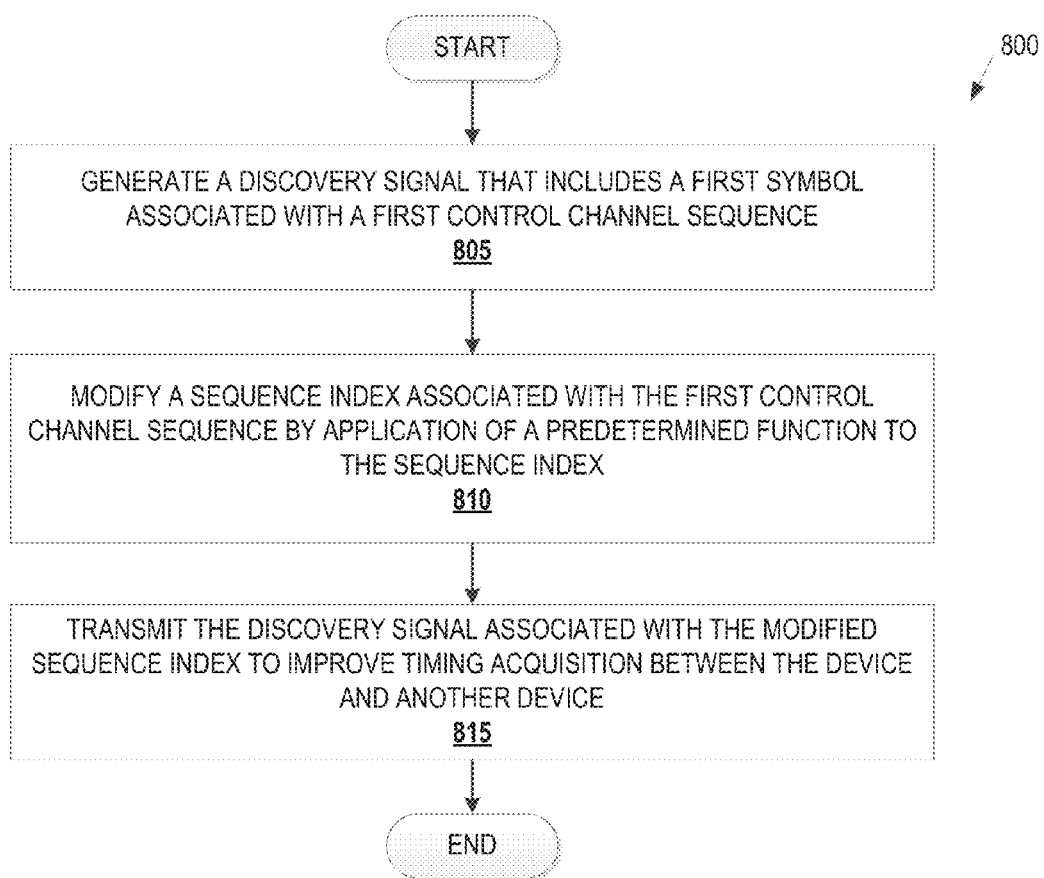
FIG. 8 is a flow diagram illustrating a method for modifying a discovery signal by modifying at least one symbol index associated with at least one symbol by application of a predetermined function to a control channel sequence, in accordance with various embodiments.

With respect to FIG. 8, a flow diagram is shown illustrating a method 800 for modifying a discovery signal by modifying at least one symbol index associated with a signal by application of a predetermined function to a control channel sequence, in accordance with some embodiments. The method 800 may be performed by a device illustrated in FIG. 1, such as a UE 150 and/or a low-powered radio access node 115 of FIG. 1, and signals to be transmitted by the device may include radio frames similar to those illustrated in FIG. 2 and/or FIG. 3. While FIG. 8 illustrates a plurality of sequential operations, one of ordinary skill would understand that one or more operations of the method 800 may be transposed and/or performed contemporaneously.

The method 800 may begin with a first operation 805 of generating a discovery signal. The discovery signal may be, for example, a signal transmitted by a device (e.g., a UE and/or a low-powered radio access node) to a receiver (e.g., another UE) so that the receiver may discover and/or synchronize with the transmitting device. Correspondingly, the discovery signal may be generated as a CDM structure to be transmitted by the transmitting device over a control channel (e.g., PUCCH of format 1, 1a, 1b, or 4). As such, the discovery signal may include a plurality of symbols (e.g., symbols associated with control information), and one or more of the included symbols may be based on one or more control channel sequences.

To improve timing acquisition, the method 800 may proceed to an operation 810 of modifying a sequence index associated with a first control channel sequence. In various embodiments, a control channel sequence associated with a sequence index to be modified may be, for example, a base sequence and/or orthogonal sequence. The sequence index associated with a first control channel sequence may be modified by changing a first symbol index associated with the sequence index to another symbol index.

In various embodiments, a sequence index associated with a first control channel sequence may be modified by application of a predetermined function or pattern to that sequence index. According to one embodiment, the predetermined function may cause a shift of a base sequence index from a first symbol index to a next symbol index, where the base sequence index for the next symbol index is an adjacent base sequence index to the base sequence index for the first symbol. According to another embodiment, the predetermined function is to cause a pseudorandom hop of a base sequence index from a first symbol index to a next symbol index, where the base sequence index for the next symbol index is pseudorandomly determined. The pseudorandom hopping function or pattern, however, may pseudorandomly cause a first base sequence index associated with a first symbol index to be associated with a pseudorandom symbol index, and therefore the next (pseudorandom) base sequence index for the next symbol may be any base sequence index, including an adjacent base sequence index or a same base sequence index. In embodiments, the pseudorandom hopping function or pattern may cause each base sequence index to be reassigned to another symbol index so that no symbols become unassociated from all symbol indices.

According to various embodiments, the predetermined function or pattern may be different across a plurality of devices. However, the predetermined function or pattern may be common across devices within a same cluster (e.g., a small cell cluster or D2D cluster) and/or connected to a same cell to preserve orthogonality by CDM (e.g., orthogonality associated with one or more cyclic shift(s) and orthogonal cover code(s)). In another embodiment to preserve orthogonality, the predetermined function or pattern may be common across devices, even where those devices are not connected to a same cell or cluster.

In connection with a modified sequence to be included in a discovery signal, the method 800 may include an operation 815 for transmitting the discovery signal associated with the modified sequence index to improve timing acquisition between the transmitting device and a receiving device. The discovery signal may be transmitted using a control channel, such as a PUCCH of format 1, 1a, 1b, or 4. In embodiments, the discovery signal may be broadcast to a plurality of receiving devices.

Figure 9:
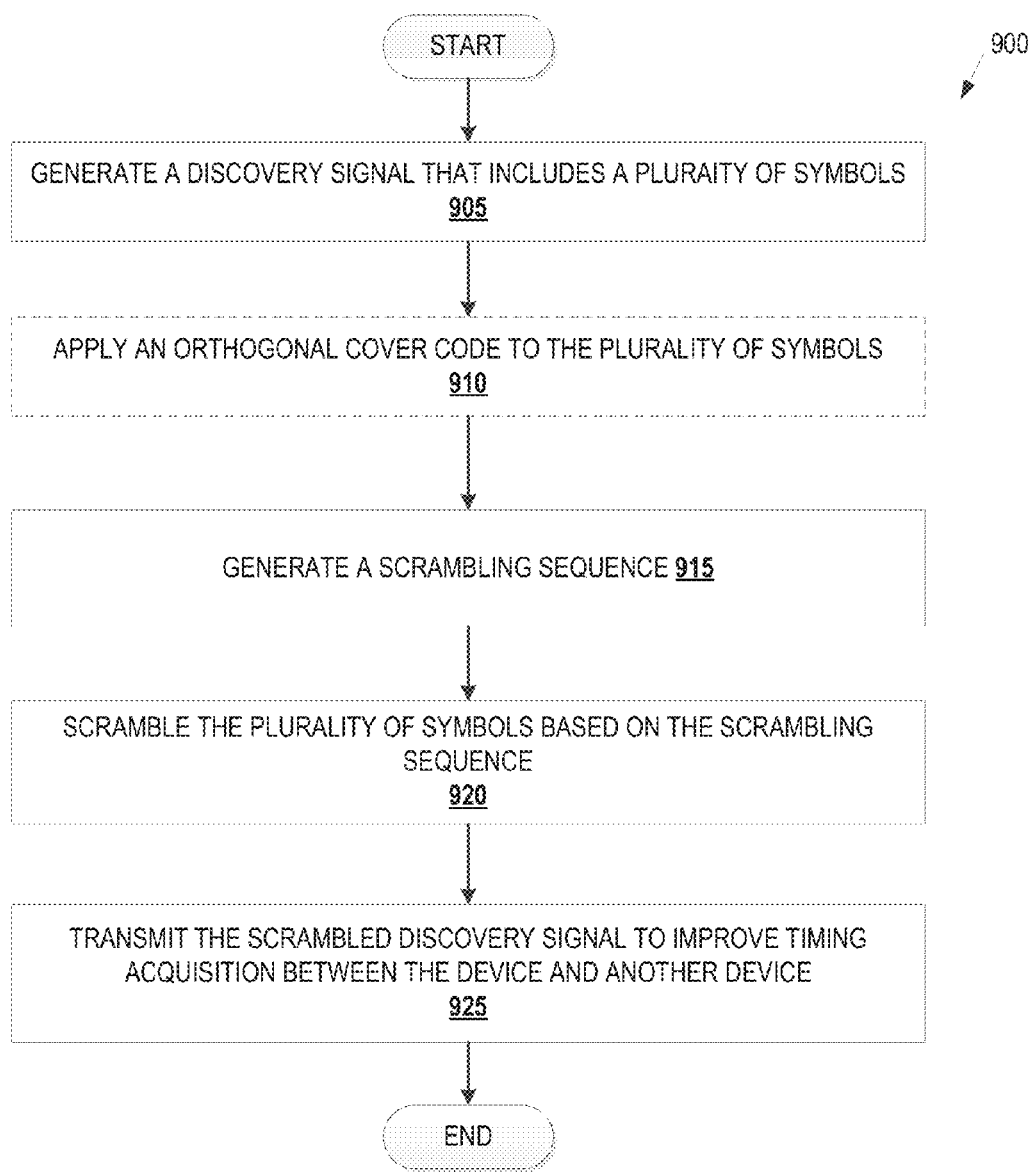
FIG. 9 is a flow diagram illustrating a method for modifying a discovery signal by scrambling a plurality of symbols associated with the discovery signal based on a scrambling sequence, in accordance with various embodiments.

With respect to FIG. 9, a flow diagram is shown illustrating a method 900 for modifying a discovery signal by scrambling a plurality of symbols associated with the discovery signal based on a scrambling sequence, in accordance with some embodiments. The method 900 may be performed by a device illustrated in of FIG. 1, such as a UE 150 and/or a low-powered radio access node 115 of FIG. 1, and signals to be transmitted by the device may be include radio frames similar to those illustrated in FIG. 5 and/or FIG. 6. While FIG. 9 illustrates a plurality of sequential operations, one of ordinary skill would understand that one or more operations of the method 900 may be transposed and/or performed contemporaneously.

The method 900 may begin with a first operation 905 of generating a discovery signal that includes a plurality of symbols. The discovery signal may be, for example, a signal transmitted by a device (e.g., a UE and/or a low-powered radio access node) to a receiver (e.g., another UE) so that the receiver may discover and/or synchronize with the transmitting device. Correspondingly, the discovery signal may be generated as a CDM structure to be transmitted by the transmitting device over a control channel (e.g., PUCCH of format 1, 1a, 1b, or 4). The plurality of symbols included in the discovery signal may be associated with one or more sequences, which may be base sequences and/or orthogonal sequences. As a means of providing additional orthogonality between layers (e.g., to increase sequences available to different devices), the method 900 may include an operation 910 for applying an orthogonal cover code to a plurality of symbols associated with the discovery signal.

According to embodiments, the method 900 may include an operation 915 for generating a scrambling sequence. The scrambling sequence may be generated based on, for example, a Golay sequence. A Golay sequence may be generated with a length that is a power of two. Therefore, the last element of a Golay sequence of length eight may be truncated for seven symbols (e.g., for a generated Golay sequence [1, 1, 1, −1, 1, 1, −1, 1], the last element [1] may be truncated).

Alternatively, a scrambling sequence may be generated based on a CAZAC sequence. In an embodiment in which the scrambling sequence is generated based on a CAZAC sequence, a Zadoff-Chu ("ZC") sequence may be used to generate the scrambling sequence. A function to generate the ZC scrambling sequence may vary depending upon the length N of a sequence to be scrambled. Where N is an odd number, the ZC scrambling sequence may be generated from $e^{-j2\pi un(n+1)/N}$. Where N is an even number, however, the ZC scrambling sequence may be generated from $e^{-j2\pi un^2/N}$ In the two functions to generate the ZC scrambling sequence, u may be the root index. The truncated version of ZC-sequence generated from a prime number may be used to have the desirable property from the prime number.

To improve timing acquisition between a transmitting device and a receiving device, an operation 920 may include applying scrambling on top of a plurality of symbols associated with the discovery signal based on the generated scrambling sequence. In various embodiments, each symbol of the plurality may be modulated with the generated scrambling sequence. Further, symbols of the plurality may be modulated with symbols that have been modulated with an orthogonal cover code.

According to various embodiments, the scrambling sequence may be different across a plurality of devices. However, the scrambling sequence may be common across devices within a same cluster (e.g., a small cell cluster or D2D cluster) and/or connected to a same cell to preserve orthogonality by CDM (e.g., orthogonality associated with one or more cyclic shift(s) and orthogonal cover code(s)). In another embodiment to preserve orthogonality, the scrambling sequence may be common across devices, even where those devices are not connected to a same cell or cluster.

Subsequently, the method 900 may reach an operation 925 for transmitting the discovery signal associated with the plurality of scrambled symbols to improve timing acquisition between the transmitting device and a receiving device. The discovery signal may be transmitted using a control channel, such as a PUCCH of format 1, 1a, 1b, or 4. In embodiments, the discovery signal may be broadcast to a plurality of receiving devices.

Figure 10:
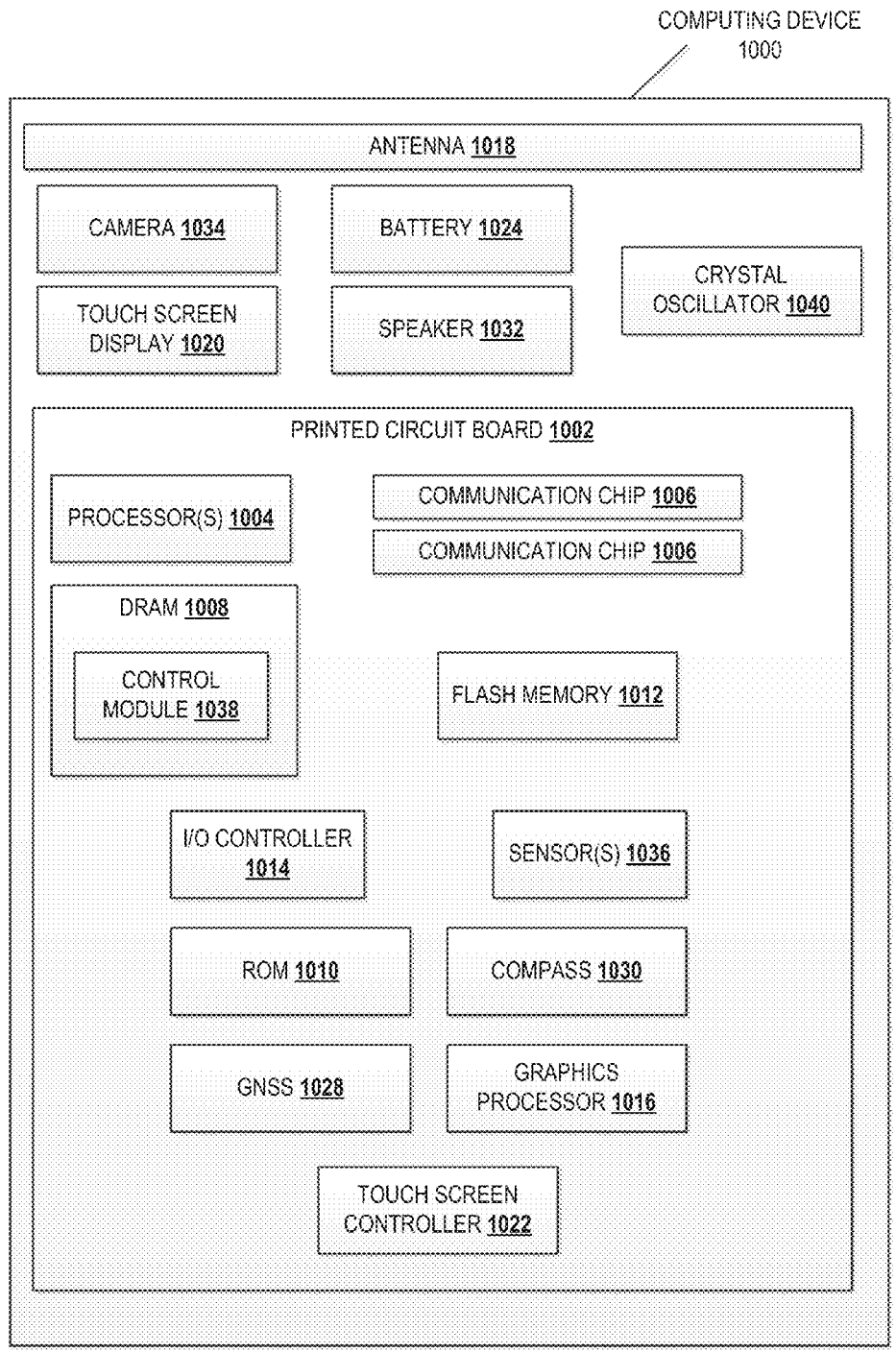
FIG. 10 is a block diagram of a computing device adapted to operate in a wireless communication network, in accordance with various embodiments.

With respect to FIG. 10, a block diagram illustrates an example computing device 1000, in accordance with various embodiments. An eNB 105, a UE 150 and/or a low-powered radio access node 115 of FIG. 1 and described herein may be implemented on a computing device such as computing device 1000. Further, the computing device 1000 may be adapted to perform one or more operations of the method 400 described with respect to FIG. 4 and/or the method 500 described with respect to FIG. 5. The computing device 1000 may include a number of components, one or more processor 1004 and at least one communication chips 1006. Depending upon the embodiment, one or more of the enumerated components may comprise "circuitry" of the computing device 1000, such as processing circuitry, communication circuitry, and the like. In various embodiments, the one or more processor(s) 1004 each may be a processor core. In various embodiments, the at least one communication chips 1006 may be physically and electrically coupled with the one or more processor(s) 1004. In further implementations, the communication chips 1006 may be part of the one or more processor(s) 1004. In various embodiments, the computing device 1000 may include a printed circuit board ("PCB") 1002. For these embodiments, the one or more processors 1004 and communication chip 1006 may be disposed thereon. In alternate embodiments, the various components may be coupled without the employment of the PCB 1002.

Depending upon its applications, the computing device 1000 may include other components that may or may not be physically and electrically coupled with the PCB 1002. These other components include, but are not limited to, volatile memory (e.g., dynamic random access memory 1008, also referred to as "DRAM"), non-volatile memory (e.g., read only memory 1010, also referred to as "ROM"), flash memory 1012, an input/output controller 1014, a digital signal processor (not shown), a crypto processor (not shown), a graphics processor 1016, one or more antenna(s) 1018, a display (not shown), a touch screen display 1020, a touch screen controller 1022, a battery 1024, an audio codec (not shown), a video code (not shown), a global navigation satellite system 1028, a compass 1030, an accelerometer (not shown), a gyroscope (not shown), a speaker 1032, a camera 1034, one or more sensors 1036 (e.g., a barometer, Geiger counter, thermometer, viscometer, rheometer, altimeter, or other sensor that may be found in various manufacturing environments or used in other applications), a mass storage device (e.g., a hard disk drive, s solid state drive, compact disk and drive, digital versatile disk and drive, etc.) (not shown), and the like. In various embodiments, the one or more processor(s) 1004 may be integrated on the same die with other components to form a system on a chip ("SOC").

In various embodiments, volatile memory (e.g., DRAM 1008), non-volatile memory (e.g., ROM 1010), flash memory 1012, and the mass storage device (not shown) may include programming instructions configured to enable the computing device 1000, in response to the execution by one or more processors 1004, to practice all or selected aspects of the data exchanges and methods described herein, depending on the embodiment of the computing device 1000 used to implement such data exchanges and methods. More specifically, one or more of the memory components (e.g., DRAM 1008, ROM 1010, flash memory 1012, and the mass storage device) may include temporal and/or persistent copies of instructions that, when executed by one or more processors 1004, enable the computing device 1000 to operate one or more modules 1038 configured to practice all or selected aspects of the data exchanges and method described herein, depending on the embodiment of the computing device 1000 used to implement such data exchanges and methods.

The communication chips 1006 may enable wired and/or wireless communication for the transfer of data to and from the computing device 1000. The term "wireless" and its derivatives may be used to describe circuits, devices, systems, methods, techniques, communication channels, etc., that may communicate data through the use of modulated electromagnetic radiation through a non-solid medium. The term does not imply that the associated devices do not contain any wires, although in some embodiments they might not. The communication chips 1006 may implement any of a number of wireless standards or protocols, including but not limited to Long Term Evolution ("LTE"), LTE Advanced ("LTE-A"), Institute of Electrical and Electronics Engineers ("IEEE") 702.20, General Packet Radio Service ("GPRS"), Evolution Data Optimized ("Ev-DO"), Evolved High Speed Packet Access ("HSPA+"), Evolved High Speed Downlink Packet Access ("HSDPA+"), Evolved High Speed Uplink Packet Access ("HSUPA+"), Global System for Mobile Communications ("GSM"), Enhanced Data Rates for GSM Evolution ("EDGE"), Code Division Multiple Access ("CDMA"), Time Division Multiple Access ("TDMA"), Digital Enhanced Cordless Telecommunications ("DECT"), Bluetooth, derivatives thereof, as well as other wireless protocols that are designated as 3G, 4G, 5G, and beyond. The computing device 1000 may include a plurality of communication chips 1006 adapted to perform different communication functions. For example, a first communication chip 1006 may be dedicated to shorter range wireless communications, such as Wi-Fi and Bluetooth, whereas a second communication chip 1006 may be dedicated to longer range wireless communications, such as GPS, EDGE, GPRS, CDMA, WiMAX, LTE, LTE-A, Ev-DO, and the like.

In various embodiments, the computing device 1000 may include a crystal oscillator 1040. The crystal oscillator 1040 may be communicatively coupled with the communication chip(s) 1006 and/or other communication circuitry. The crystal oscillator may use mechanical resonance of vibrating crystal (e.g., of piezoelectric material) to create an electrical signal with a very precise frequency. Thus, the crystal oscillator 1040 may be used to generate signals that are transmitted by a UE.

In various implementations, the computing device 1000 may be a laptop, netbook, a notebook computer, an ultrabook computer, a smart phone, a computing tablet, a personal digital assistant ("PDA"), an ultra mobile personal computer, a mobile phone, a desktop computer, a server, a printer, a scanner, a monitor, a set-top box, an entertainment control unit (e.g., a gaming console), a digital camera, a portable digital media player, a digital video recorder, and the like. In further embodiments, the computing device 1000 may be another other electronic device that processes data.

Figure 11:
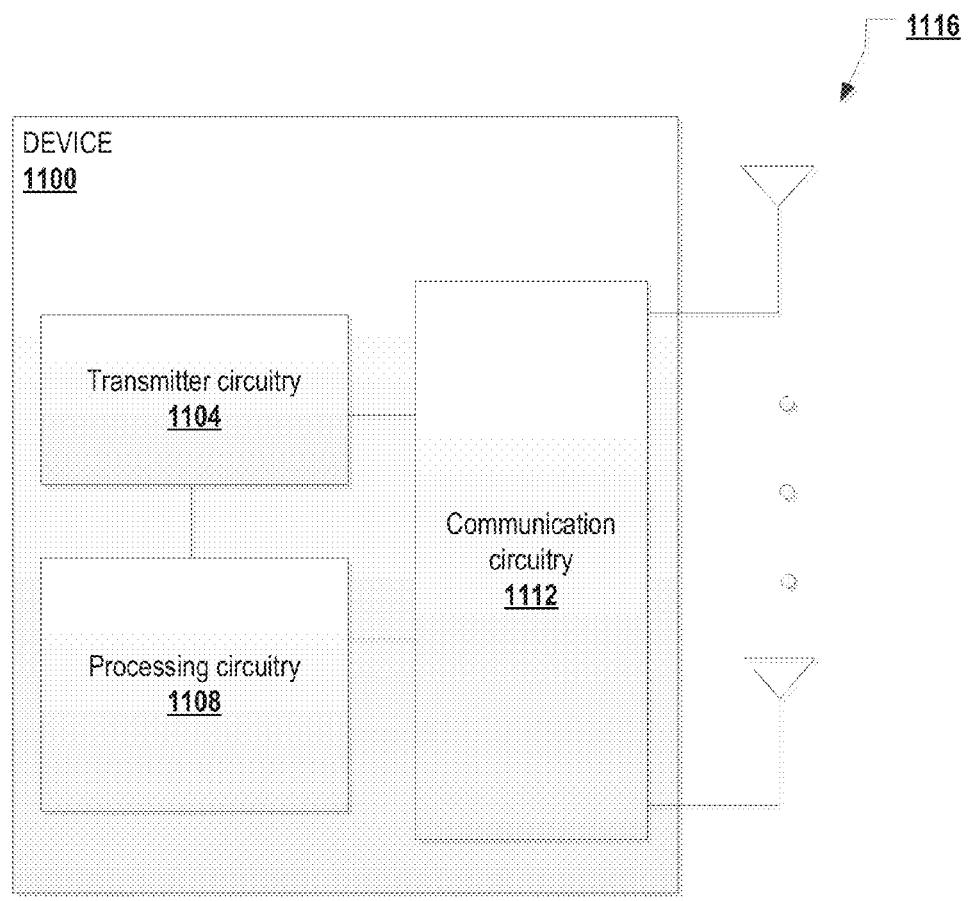
FIG. 11 is a block diagram of a transmitting device, in accordance with various embodiments.

FIG. 11 illustrates a device 1100 in accordance with some embodiments. The device 1100 may be similar to, and substantially interchangeable with a UE 150 and/or low-powered radio access node 115 of FIG. 1. The device 1100 may include transmitter circuitry 1104, processing circuitry 1108, communication circuitry 1112, and one or more antennas 1116 coupled with each other at least as shown.

Briefly, the communication circuitry 1112 may be coupled with the antennas to facilitate over-the-air communication of signals to/from the device 1100. Operations of the communication circuitry 1112 may include, but is not limited to, filtering, amplifying, storing, modulating, demodulating, transforming, etc.

The transmitter circuitry 1104 may be coupled with the communication circuitry 1112 and may be configured to provide signals to the communication circuitry 1112 for transmission by the antennas 1116. In various embodiments, the transmitter circuitry 1104 may be configured to provide various signal processing operations on the signal to provide the signal to the communication circuitry with appropriate characteristics.

The processing circuitry 1108 may be coupled with the communication circuitry 1112 and may be configured to receive signals from the communication circuitry 1112 for transmission by the communication circuitry 1112. In some embodiments, the processing circuitry 1108 may be adapted to generate signals. Further, the processing circuitry 1108 may be adapted to scramble, multiplex, and/or modulate various signals prior to transmission by the communication circuitry 1112.

Some or all of the communication circuitry 1112, transmitter circuitry 1104, and/or the processing circuitry 1108 may be included in, for example, a communication chip and/or communicatively coupled with a printed circuit board as described with respect to FIG. 6.

In various embodiments, example 1 may be an apparatus to be included in a device, the apparatus comprising: processing circuitry: to generate a discovery signal that includes a first symbol associated with a first control channel sequence for discovery of the device by another device for a wireless device-to-device communication; and to modify a sequence index associated with the first control channel sequence by application of a predetermined function to the sequence index, the predetermined function to change an association of the sequence index from a first symbol index to a second symbol index; and communication circuitry, communicatively coupled with the processing circuitry, the communication circuitry to transmit the discovery signal associated with the modified sequence index to improve timing acquisition between the device and the other device. Example 2 may include the apparatus of example 1, wherein the processing circuitry is to: shift the sequence index associated with the first control channel sequence by application of the predetermined function, the shift of the sequence index to change a first symbol index associated with the sequence index to an adjacent symbol index. Example 3 may include the apparatus of example 2, wherein the apparatus is to apply a cyclic shift $\alpha$ to the first control channel sequence $\bar{r}_{u,v}(n)$, the cyclically shifted first control channel sequence $\bar{r}_{u,v}^{(\alpha)}(n)$ defined by $e^{j\alpha n} \bar{r}_{u,v,l}(n)$, $0 \leq n \leq M_{sc}^{RS}$, where $M_{sc}^{RS}$ is a length of the first control channel sequence, l is the symbol index, and the shift of the sequence index associated with the first control channel sequence is defined by $\bar{r}_{u,v,l}(n) = \bar{r}_{u+l,v}(n)$. Example 4 may include the apparatus of example 1, wherein the processing circuitry is to: modify a sequence index associated with the first control channel sequence by application of the predetermined function, the modification of the sequence index to change a first symbol index associated with the sequence index to a pseudorandom symbol index based on a pseudorandom hopping pattern. Example 5 may include the apparatus of example 4, wherein the apparatus is to apply a cyclic shift $\alpha$ to the first control channel sequence $\bar{r}_{u,v}(n)$, the cyclically shifted first control channel sequence $\bar{r}_{u,v}^{(\alpha)}(n)$ defined by $e^{j\alpha n} \bar{r}_{u,v,l}(n)$, $0 \leq n \leq M_{sc}^{RS}$, where $M_{sc}^{RS}$ is a length of the first control channel sequence, l is the symbol index, the modification of the sequence index associated with the first control channel sequence is defined by $\bar{r}_{u,v,l}(n) = \bar{r}_{u+f(l),v}(n)$, and f(l) is given by the pseudorandom hopping pattern. Example 6 may include the apparatus of any of examples 1-5, wherein the first control channel sequence is a physical uplink control channel sequence and the communication circuitry is to transmit the discovery signal, to the other device, using a physical uplink control channel. Example 7 may include the apparatus of any of examples 1-5, wherein the first control channel sequence is a base sequence or an orthogonal sequence. Example 8 may include the apparatus of any of examples 1-5, wherein the device is unsynchronized with the other device. Example 9 may include the apparatus of any of examples 1-5, wherein the device in which the apparatus is to be included is a user equipment ("UE") to operate on a wireless cell or a low-powered radio access node adapted to provide a small cell.

In various embodiments, example 10 may be an apparatus to be included in a device, the apparatus comprising: processing circuitry to: generate a discovery signal that includes a plurality of symbols associated with discovery of the device by another device for a wireless device-to-device communication, and scramble the plurality of symbols included in the discovery signal based on a scrambling sequence; and communication circuitry, communicatively coupled with the processing circuitry, the communication circuitry to transmit the scrambled discovery signal to improve timing acquisition associated with the device. Example 11 may include the apparatus of example 10, wherein the symbols are orthogonal frequency-division multiplexing symbols or single-carrier frequency division multiple access symbols. Example 12 may include the apparatus of example 10, wherein the processing circuitry is to: apply an orthogonal cover code to the plurality of symbols before the processing circuitry is to scramble the plurality of symbols based on the scrambling sequence. Example 13 may include the apparatus of any of examples 10-12, wherein the processing circuitry is to: generate the scrambling sequence. Example 14 may include the apparatus of example 13, wherein the processing circuitry is to: generate the scrambling sequence based on a Golay sequence of length eight having a last element truncated. Example 15 may include the apparatus of example 13, wherein the processing circuitry is to: generate the scrambling sequence based on a constant amplitude zero autocorrelation sequence. Example 16 may include he apparatus of example 15, wherein the constant amplitude zero autocorrelation sequence is a Zadoff-Chu sequence. Example 17 may include the apparatus of any of examples 10-12, wherein communication circuitry is to transmit the discovery signal using a physical uplink control channel. Example 18 may include the apparatus of any of examples 10-12, wherein the device in which the apparatus is to be included is a user equipment ("UE") adapted to operate on a wireless cell or a low-powered radio access node adapted to provide a small cell. Example 19 may include the computer-implemented method to be performed in a device associated with a wireless network for discovery in the wireless network, the method comprising: generating a discovery signal that includes a first symbol associated with a first control channel sequence for discovery of the device in a wireless network; applying a predetermined function to a first sequence index associated with the first sequence, the predetermined function adapted to change associations of sequence indices and symbol indices within the discovery signal; and transmitting the discovery signal to improve timing acquisition associated with the device. Example 20 may include the computer-implemented method of example 19, wherein the applying the predetermined function to the first sequence comprises: shifting a plurality of sequence indices to change the first sequence index associated with a first symbol index an adjacent symbol index. Example 21 may include the computer-implemented method of example 19, wherein the applying the predetermined function to the first sequence index comprises: hopping, based on a pseudorandom hopping pattern, a plurality of sequence indices to change a respective sequence index associated with a first symbol index to a new symbol index.

In various embodiments, example 22 may include a computer-implemented method to be performed in a device associated with a wireless network for discovery in the wireless network, the method comprising: generating a discovery signal that includes a plurality of symbols associated with discovery of the device in a wireless network; scrambling the plurality of symbols included in the discovery signal based on a scrambling sequence; and transmitting the scrambled discovery signal to a second device associated with the wireless network to improve timing acquisition between the devices. Example 23 may include the computer-implemented method of example 22, further comprising: applying an orthogonal cover code to the plurality of symbols before the scrambling of the plurality of symbols based on the scrambling sequence. Example 24 may include the computer-implemented method of any of examples 22-23, further comprising: generating the scrambling sequence. Example 25 may include the computer-implemented method of example 24, wherein the scrambling sequence is to be generated based on a Golay sequence or a constant amplitude zero autocorrelation sequence.

In various embodiments, example 26 may be an apparatus, the apparatus comprising: means for generating a discovery signal that includes a first symbol associated with a first control channel sequence for discovery of the device in a wireless network; means for applying a predetermined function to a first sequence index associated with the first sequence, the predetermined function adapted to change associations of sequence indices and symbol indices within the discovery signal; and means transmitting the discovery signal to improve timing acquisition associated with the device. Example 27 may include the apparatus example 26, wherein the first control channel sequence is a physical uplink control channel sequence and the transmitting means is to transmit the discovery signal, to the other device, using a physical uplink control channel Example 28 may include the apparatus of example 26, wherein the first control channel sequence is a base sequence or an orthogonal sequence. Example 29 may include the apparatus of example 26, wherein the device is unsynchronized with the other device. Example 30 may include the apparatus of example 26, wherein the apparatus is to be included in a user equipment ("UE") adapted to operate on a wireless cell or a low-powered radio access node adapted to provide a small cell. Example 31 may include the apparatus of any of examples 26-30, wherein the means for applying the predetermined function to the first sequence comprises: means for shifting a plurality of sequence indices to change the first sequence index associated with a first symbol index an adjacent symbol index. Example 32 may include the apparatus of example 31, wherein the shifting means is to apply a cyclic shift $\alpha$ to the first control channel sequence $\bar{r}_{u,v}(n)$, the cyclically shifted first control channel sequence $\bar{r}_{u,v}^{(\alpha)}(n)$ defined by $e^{j\alpha n} \bar{r}_{u,v,l}(n)$, $0 \leq n \leq M_{sc}^{RS}$, where $M_{sc}^{RS}$ is a length of the first control channel sequence, l is the symbol index, and the shift of the sequence index associated with the first control channel sequence is defined by $\bar{r}_{u,v,l}(n) = \bar{r}_{u+l,v}(n)$. Example 33 may include the apparatus of any of examples 26-30, wherein the means for applying the predetermined function to the first sequence index comprises: means for hopping, based on a pseudorandom hopping pattern, a plurality of sequence indices to change a respective sequence index associated with a first symbol index to a new symbol index. Example 34 may include the apparatus of example 33, wherein the hopping means is to apply a cyclic shift $\alpha$ to the first control channel sequencer $\bar{r}_{u,v}(n)$, the cyclically shifted first control channel sequence $\bar{r}_{u,v}^{(\alpha)}(n)$ defined by $e^{j\alpha n} \bar{r}_{u,v,l}(n)$, $0 \leq n \leq M_{sc}^{RS}$, where $M_{sc}^{RS}$ is a length of the first control channel sequence, l is the symbol index, the modification of the sequence index associated with the first control channel sequence is defined by $\bar{r}_{u,v,l}(n) = \bar{r}_{u+f(l),v}(n)$, and f(l) is given by the pseudorandom hopping pattern.

In various embodiments, example 35 may be an apparatus, the apparatus comprising: means for generating a discovery signal that includes a plurality of symbols associated with discovery of the device in a wireless network; means for scrambling the plurality of symbols included in the discovery signal based on a scrambling sequence; and means for transmitting the scrambled discovery signal to a second device associated with the wireless network to improve timing acquisition between the devices. Example 36 may include the apparatus of example 35, further comprising: means for applying an orthogonal cover code to the plurality of symbols before the scrambling of the plurality of symbols based on the scrambling sequence. Example 37 may include the apparatus of any of examples 35-36, further comprising: means for generating the scrambling sequence. Example 38 may include the apparatus of any of examples 35-36, wherein the means for generating the scrambling sequence is to generate the scrambling sequence based on a Golay sequence or a constant amplitude zero autocorrelation sequence. Example 39 may include the apparatus of any of examples 35-36, wherein the transmitting means is to transmit the discovery signal using a physical uplink control channel. Example 40 may include the apparatus of any of examples 35-36, wherein the apparatus is to be included in a user equipment ("UE")

adapted to operate on a wireless cell or a low-powered radio access node adapted to provide a small cell.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures can be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described can be performed in a different order. Moreover, some operations can be performed in parallel rather than sequentially.

Embodiments of the present invention are not described with reference to any particular programming language. It will be appreciated that a variety of programming languages can be used to implement the teachings of embodiments of the invention as described herein.

In the foregoing Specification, embodiments of the invention have been described with reference to specific exemplary embodiments thereof. It will be evident that various modifications can be made thereto without departing from the broader spirit and scope of the invention as set forth in the following claims. The Specification and drawings are, accordingly, to be regarded in an illustrative sense rather than a restrictive sense.

What is claimed is:

1. An apparatus to be included in a device, the apparatus comprising:
   processing circuitry:
     to generate a discovery signal that includes a first symbol of a plurality of symbols associated with a first control channel sequence for discovery of the device by another device for a wireless device-to-device communication; and
     to modify a sequence index associated with the first control channel sequence by application of a predetermined function to the sequence index, the predetermined function to change an association of the sequence index from a first symbol index to a second symbol index; and
   communication circuitry, communicatively coupled with the processing circuitry, the communication circuitry to transmit the discovery signal associated with the modified sequence index to improve timing acquisition between the device and the other device.

2. The apparatus of claim 1, wherein the processing circuitry is to:
   shift the sequence index associated with the first control channel sequence by application of the predetermined function, the shift of the sequence index to change a first symbol index associated with the sequence index to an adjacent symbol index.

3. The apparatus of claim 2, wherein the apparatus is to apply a cyclic shift a to the first control channel sequence $\bar{r}_{u,v,l}(n)$, the cyclically shifted first control channel sequence $\bar{r}_{u,v}^{(\alpha)}(n)$ defined by $e^{j\alpha n}\bar{r}_{u,v,l}(n)$, $0 \leq n \leq M_{sc}^{RS}$, where $M_{sc}^{RS}$ is a length of the first control channel sequence, l is the symbol index, and the shift of the sequence index associated with the first control channel sequence is defined by $\bar{r}_{u,v,l}(n)=\bar{r}_{u+1,v}(n)$.

4. The apparatus of claim 1, wherein the processing circuitry is to:
   modify a sequence index associated with the first control channel sequence by application of the predetermined function, the modification of the sequence index to change a first symbol index associated with the sequence index to a pseudorandom symbol index based on a pseudorandom hopping pattern.

5. The apparatus of claim 4, wherein the apparatus is to apply a cyclic shift a to the first control channel sequence $\bar{r}_{u,v,l}(n)$, the cyclically shifted first control channel sequence $\bar{r}_{u,v}^{(\alpha)}(n)$ defined by $e^{j\alpha n}\bar{r}_{u,v,l}(n)$, $0 \leq n \leq M_{sc}^{RS}$, where $M_{sc}^{RS}$ where is a length of the first control channel sequence, l is the symbol index, the modification of the sequence index associated with the first control channel sequence is defined by $\bar{r}_{u,v,l}(n)=\bar{r}_{u+f(l),v}(n)$ and f(l) is given by the pseudorandom hopping pattern.

6. The apparatus claim 1, wherein the first control channel sequence is a physical uplink control channel sequence and the communication circuitry is to transmit the discovery signal, to the other device, using a physical uplink control channel.

7. The apparatus of claim 1, wherein the first control channel sequence is a base sequence or an orthogonal sequence.

8. The apparatus of claim 1, wherein the device is unsynchronized with the other device.

9. The apparatus of claim 1, wherein the device in which the apparatus is to be included is a user equipment ("UE") to operate on a wireless cell or a low-powered radio access node to provide a small cell.

10. A non-transitory computer-readable medium having stored thereon instructions to be performed in a device associated with a wireless network for discovery in the wireless network, the non-transitory computer-readable medium comprising instructions to:
   generate a discovery signal that includes a first symbol of a plurality of symbols associated with a first control channel sequence for discovery of the device in a wireless network;
   apply a predetermined function to a first sequence index associated with the first sequence, the predetermined function to change associations of sequence indices and symbol indices within the discovery signal; and transmit the discovery signal to improve timing acquisition associated with the device.

11. The non-transitory computer-readable medium of claim 10, wherein the instructions to apply the predetermined function to the first sequence comprises instructions to:

shift a plurality of sequence indices to change the first sequence index associated with a first symbol index an adjacent symbol index.

12. The non-transitory computer-readable medium of claim 10, wherein the instructions to apply the predetermined function to the first sequence index comprises instructions to:

hop, based on a pseudorandom hopping pattern, a plurality of sequence indices to change a respective sequence index associated with a first symbol index to a new symbol index.

\* \* \* \* \*